United States Patent
Preisinger

(10) Patent No.: US 11,525,672 B2
(45) Date of Patent: Dec. 13, 2022

(54) DEVICE AND METHOD FOR DETERMINING AN ANGLE BETWEEN TWO WORKPIECE SURFACES

(71) Applicant: KEBA AG, Linz (AT)

(72) Inventor: Gernot Preisinger, Linz (AT)

(73) Assignee: KEBA INDUSTRIAL AUTOMATION GMBH, Linz (AT)

(*) Notice: Subject to any disclaimer, the term of this patent is extended or adjusted under 35 U.S.C. 154(b) by 389 days.

(21) Appl. No.: 16/623,574

(22) PCT Filed: Jun. 13, 2018

(86) PCT No.: PCT/EP2018/065736
§ 371 (c)(1),
(2) Date: Dec. 17, 2019

(87) PCT Pub. No.: WO2018/234128
PCT Pub. Date: Dec. 27, 2018

(65) Prior Publication Data
US 2021/0095956 A1    Apr. 1, 2021

(30) Foreign Application Priority Data

Jun. 19, 2017 (DE) .......................... 102017113419.0

(51) Int. Cl.
*G01B 11/26* (2006.01)
*B21D 5/00* (2006.01)
(52) U.S. Cl.
CPC .............. *G01B 11/26* (2013.01); *B21D 5/006* (2013.01)
(58) Field of Classification Search
CPC ..................................................... G01B 11/26
(Continued)

(56) References Cited

U.S. PATENT DOCUMENTS 5,071,252 A    12/1991   Matsuura
6,498,648 B1   12/2002   Schwarz
(Continued)

FOREIGN PATENT DOCUMENTS

AT    515521 A4    10/2015
CN    1116703 A    2/1996
(Continued)

OTHER PUBLICATIONS

China National Intellectual Property Administration, Office Action and Search Report Issued in Application No. 201880041222.4, dated Jan. 4, 2021, 11 pages.
(Continued)

*Primary Examiner* — Yulin Sun
(74) *Attorney, Agent, or Firm* — Alleman Hall Creasman & Tuttle LLP

(57) ABSTRACT

A device for determining an angle between two workpiece surfaces, comprising a transmitter for producing a light beam, a continuously rotating directional rotor for emitting the produced light beam in a rotating emission direction perpendicular to an axis of rotation of the directional rotor, a receiver for receiving a reflected light beam when the emitted light beam is reflected antiparallel to the emission direction by one of the two workpiece surfaces, an emission angle sensor unit for determining emission angles of the emitted light beam at which the receiver receives the reflected light beam, a calibrating unit for determining at least calibration parameters, a memory unit for storing the calibration parameters and an error model, and an evaluation unit configured to determine the angle as a function of the determined emission angles of the light beam emitted by the directional rotor, the stored calibration parameters and the stored error model.

18 Claims, 12 Drawing Sheets

(58) Field of Classification Search
USPC .................................................. 356/152.3
See application file for complete search history.

(56) References Cited

U.S. PATENT DOCUMENTS

| | | | |
|---|---|---|---|
| 10,677,953 B2* | 6/2020 | Stetson | G01R 33/032 |
| 2001/0026363 A1 | 10/2001 | Brinkman et al. | |
| 2009/0171610 A1 | 7/2009 | Haijima et al. | |
| 2013/0284909 A1 | 10/2013 | Ohtomo et al. | |
| 2014/0009604 A1* | 1/2014 | Hinderling | G01S 17/86 |
| | | | 348/142 |
| 2017/0003114 A1 | 1/2017 | Budleski | |
| 2017/0138724 A1* | 5/2017 | Woegerbauer | B21D 5/0209 |
| 2017/0203349 A1 | 7/2017 | Angerer et al. | |
| 2019/0154439 A1* | 5/2019 | Binder | G01B 11/26 |

FOREIGN PATENT DOCUMENTS

| | | |
|---|---|---|
| CN | 1335483 A | 2/2002 |
| CN | 1506768 A | 6/2004 |
| CN | 1681007 A | 10/2005 |
| CN | 101006558 A | 7/2007 |
| CN | 102090035 A | 6/2011 |
| CN | 105358935 A | 2/2016 |
| CN | 106461381 A | 2/2017 |
| CN | 106524910 A | 3/2017 |
| DE | 202010006391 U1 | 12/2010 |
| EP | 0915320 B1 | 3/2004 |
| EP | 2523017 A1 | 11/2012 |
| EP | 3155366 A1 | 4/2017 |
| JP | 2002059217 A | 2/2002 |
| JP | 2007040762 A | 2/2007 |
| WO | 9730327 A1 | 8/1997 |
| WO | 2015188213 A1 | 12/2015 |
| WO | 2015196230 A1 | 12/2015 |

OTHER PUBLICATIONS

Japan Patent Office, Office Action Issued in Application No. 2019-569735, dated Oct. 28, 2020, 4 pages.
ISA European Patent Office, International Search Report and Written Opinion Issued in Application No. PCT/EP2018/065736, dated Aug. 14, 2018, WIPO, 17 pages.
ISA European Patent Office, International Search Report Issued in Application No. PCT/EP2018/065736, dated Aug. 14, 2018, WIPO, 2 pages.
International Bureau of WIPO, International Preliminary Reporton Patentability Issued in Application No. PCT/EP2018/065736, dated Dec. 19, 2019, WIPO, 6 pages.

* cited by examiner

DEVICE AND METHOD FOR DETERMINING AN ANGLE BETWEEN TWO WORKPIECE SURFACES

FIELD

The present invention relates to a device and a method for determining, in particular for contactlessly determining, an angle between two workpiece surfaces, such as an inner angle of a sheet metal bent on a sheet metal bending machine.

BACKGROUND

From JP 2002059217 A, a device for optical measurement of an angle between two surfaces, such as two workpiece surfaces, is known, at which a laser beam generated by a laser transmitter is fanned out from a rotating mirror in a plane perpendicular to the two surfaces such that the rotating laser beam passages over the surfaces. Light reflected from the surfaces towards the rotating mirror is directed from the rotating mirror via a semi-permeable mirror to a light-sensitive sensor which generates an electrical signal in dependence on the incoming amount of light. The amount of light which is directed onto the light-sensitive sensor varies with the angle position of the mirror and respectively reaches in its course local intensity maxima when the laser beam is essentially oriented perpendicular onto one of the two surfaces. On the basis of the rotational positions of the rotating mirror at which the local intensity maxima of the reflected light occur, the inner angle between the surfaces can be determined.

From WO 2015/196230 A1, a device for contactless angle determination is known at which as a laser transmitter a semiconductor laser diode is used, and as a light-sensitive sensor a monitor diode is used which is integrated in the semiconductor laser diode. The monitor diode is provided for power regulation of the laser transmitter, but also responds to incoming laser light and can thus be used for the detection of light, which is reflected from the surfaces, at the position of the laser transmitter without needing a semi-permeable mirror. The semiconductor diode is compact and can directly be arranged onto the axis of rotation of the rotating mirror. For rotating the mirror, a miniature synchronous motor is used. By doing this, the device of WO 2015/196230 A1 achieves a compact design and is suitable as a hand angle measurement device.

Nevertheless, the device of WO 2015/196230 A1 is not optimally suitable for applications such as workpiece control at sheet metal bending machines, where measurement accuracies in the order of 0.3° to 0.1° or more accurately are aspired, due to only with a high effort avoidable tolerances at the manufacturing and the orientation of their miniaturized components as well as due to the typical inner structure of conventional laser diodes.

SUMMARY

Against this background, an object of the present invention is to improve the measurement accuracy at the determination of an angle between two workpiece surfaces, in particular when the determination is performed by a device with a compact design.

According to a first aspect, a device for determining an angle between two workpiece surfaces is proposed which is also referred to as an angle measurement device in the following and comprises: a transmitter for generating a light beam; a continuously rotating directional rotor for emitting the generated light beam in a rotating emission direction perpendicular to an axis of rotation of the directional rotor as an emitted light beam; a receiver for receiving a reflected light beam when the axis of rotation of the directional rotor is arranged axially parallel to a vertex axis of the angle and the emitted light beam is reflected antiparallel to the emission direction by one of the two workpiece surfaces; an emission angle sensor unit for detecting respective emission angles of the emitted light beam at which the receiver receives the reflected light beam; a calibrating unit for determining at least calibration parameters; a memory unit for storing the calibration parameters and an error model, and an evaluating unit configured to determine the angle as a function of the detected emission angles of the light beam emitted by the directional rotor, the stored calibration parameters and the stored error model.

A respective workpiece surface can comprise a planar surface of a respective arbitrary object. In particular, the angle measurement device is configured for contactlessly determining the angle between the workpiece surfaces.

For example, the transmitter is a laser transmitter or an LED-light source. In particular, the transmitter can comprise a semiconductor diode. Further, the angle measurement device can have a collimation optic for bundling of light that is generated from the semiconductor diode to a generated laser beam which extends along a propagation direction. For example, the generated light beam is a laser beam or a light beam of an LED-light source. For example, the receiver can be a light-sensitive sensor configured to generate an electrical signal which indicates a received light intensity.

The continuously rotating directional rotor can be driven via a shaft from a motor, such as a miniature synchronous motor. For example, the directional rotor can be configured for emitting the generated light beam in a rotating emission direction perpendicular to an axis of rotation of the directional rotor, because the transmitter is fixed to the directional rotor and rotates together with the directional rotor around the axis of rotation of the directional rotor.

For example, the axis of rotation of the directional rotor can be arranged axially parallel to a vertex axis of the angle because an operator holds the angle measurement device in preparation of the measurement operation between the two workpiece surfaces. In particular, the term "axially parallel" is therefore to be understood such that an essentially axially parallel arrangement of the axis of rotation of the directional rotor to a vertex axis of the angle is also comprised, as it can be achieved with a hand angle measurement device.

In particular, the term "anti-parallel" can likewise be referred to a direction which is essentially anti-parallel to the emission direction or is essentially with the emission direction in a coaxial direction. For example, the receiver can receive the light beam reflected anti-parallel to the emission direction, because it is arranged in a propagation path of the reflected light beam or a semi-permeable mirror can be provided in the propagation path of the reflected light beam in order to direct at least a part of the reflected light beam to the receiver.

It goes without saying that depending on the surface finish of a respective workpiece surface, the emitted light beam if it is reflected from the workpiece surface, can be diffusively reflected and/or fanned out under circumstances. Thereby, the reflected light beam can be understood as that part of the light reflected at the workpiece surface which essentially propagates anti-parallel to the emission direction back towards to the rotational rotor.

In particular, an emission angle of the emitted light beam can be understood as the angle of the immediately emission direction of the emitted light beam compared to a predefined reference direction in a plane in which the generated light beam is fanned out from the continuously rotating directional rotor.

For example, the emission angle sensor unit can be configured to detect the respective emission angles $\alpha 1$ which the receiver receives the light beam which is reflected axially parallel to the emission direction, by: determining the maximal intensity of the signal outputted by the receiver, determining the corresponding rotational position of the directional rotor by reading out an angle sensor coupled with the axis of rotation of the directional rotor or with the axis of the motor which drives the directional rotor, and detecting the emission angle of the light beam emitted by the directional rotor as a function of the detected rotational position of the directional rotor. For example, the function can be a multiplication with two or with one.

In particular, the calibrating unit is configured to determine the calibration parameters, when a calibrating operation with the angle measurement device is performed. The calibrating unit can determine the calibration parameters fully autonomically or by interaction with an operator.

The calibration parameters can be coefficients of a mathematical function of an error model which exactly or approximately describes an angle-dependent error, such as the emission angle detected by the emission angle sensor unit. The error model can be stored in the memory unit in advance.

In particular, as an error of the detected emission angle can be understood that one magnitude around which the detected emission angle is to be corrected so that the angle measurement device exactly determines the actual angle between the workpiece surfaces. Therefore, the error can be understood as a deviation between a detected emission angle at which the reflected light beam is received by the receiver, and a correct emission angle at which the emitted light beam is reflected anti-parallel to the emission direction or would be reflected anti-parallel to the emission direction, if the angle measurement device would be free of manufacturing and adjustment tolerances. For example, causes for the error can be an uneven rotation velocity of the directional rotor, an inaccurate orientation of the axis of rotation of the directional rotor and the propagation direction of the generated light beam or an inaccurate positioning of the receiver, and are designed as device-specific error causes.

In particular, the evaluating unit can be configured to determine the angle between the workpiece surfaces by forming a difference between 180° and the difference out of two corrected emission angles of the light beam emitted by the directional rotor. In particular, the two corrected emission angles of the light beam emitted by the directional rotor relate to results of a correction of the two detected emission angles of the light beam emitted by the directional rotor carried out based on the error model and the calibration parameters, at which the receiver has received the light beam which has been reflected from one of the two workpiece surfaces.

Advantageously, the device-specific error causes can thus be modelled by the error model. The angle measurement device can be calibrated by determining the calibration parameters for the error model, and the errors can be at least approximately corrected. Thus, the measurement accuracy of the angle measurement device can be improved.

Advantageously, by correcting the device-specific error causes on the basis of the error model, additionally, a time effort mechanical adjustment of the components of the angle measurement device for minimizing the error can be omitted. Advantageously, the angle measurement device can be formed entirely without any mechanical adjustment capability. Thus, it is avoided that an adjustment of the angle measurement device is deteriorated over time, and in an advantageous manner, the measurement accuracy of the angle measurement device can be further improved. Additionally, by omitting the adjustment capability, the manufacturing costs of the angle measurement device can be decreased. Furthermore, the omitting of the adjustment capability makes the further miniaturization of the measurement system possible, and thus the integration into a compact hand measurement device.

The evaluating unit can be further configured to output a signal which indicates the specific angle to an external means and/or to display the specific angle on a display unit.

According to an embodiment, the directional rotor forms a planar reflection surface for the light beam generated by the transmitter.

In a variant, the planar reflection surface can be arranged such that the reflection surface extends parallel to the direction of the axis of rotation of the directional rotor, wherein the axis of rotation of the directional rotor is orthogonal or is essentially orthogonal to the propagation direction of the generated light beam. In the variant, the emission angle sensor unit can be configured to determine the emission angle as twice the rotational position of the directional rotor.

In a further variant, the planar reflection surface can be arranged such that the reflection surface extends obliquely to the axis of rotation of the directional rotor, in particular inclined by 45° to the axis of rotation, wherein the axis of rotation of the directional rotor is essentially coaxial with the propagation direction of the generated laser beam. In the variant, the emission angle sensor unit can be configured to determine the emission angle as the rotational position of the rotational rotor.

The planar reflection surface of the directional rotor can reflect the light beam generated by the transmitter in the emission direction which is orthogonal to the axis of rotation of the directional rotor, and can reflect the light beam, essentially reflected from one of the workpiece surfaces anti-parallel to the emission direction, to the receiver.

Advantageously, it is therefore not required that the transmitter, the optionally provided collimation optic and the receiver rotate around with the directional rotor. Hereby, it is easier to transmit the signal of the receiver to units such as the calibrating unit and the evaluating unit. Thus, the angle measurement device can have a compact and robust design at which the only movable component or at least the only rotating component is the rotating directional rotor with the planar reflection surface.

According to a further embodiment, the transmitter has a monitor diode, and the monitor diode forms the receiver.

In particular, the transmitter according to the present embodiment is a semiconductor diode, such as a laser diode. The monitor diode is particularly arranged in the laser diode such that it detects at least a part of the laser light generated from a laser chip of the laser diode and can, for example, supply an electrical signal which indicates the intensity of the laser light detected from the monitor diode. Therefore, the monitor diode can be used for power regulation of the laser diode. If the reflected light beam hits onto the laser diode, the monitor diode can supply an electrical signal which indicates the combined intensity of the generated laser light and the reflected light beam. Thus, the monitor diode of the transmitter can be used as the receiver. Advantageously, a separate sensor for the receiver as well as a semi-permeable mirror for deflecting a part of the reflected light beam to the separate sensor can therefore be omitted. Furthermore, due to the compact design of the semiconductor diode, the transmitter can be oriented in an advantageous manner under waiving of a stationary deflection mirror directly towards the axis of rotation of the directional rotor with the reflection surface. Thus, the laser diode with the monitor diode makes a compact design of the angle measurement device with a reduced number of components possible.

According to a further embodiment, the angle measurement device has a timer configured to output a clocked time signal to the emission angle sensor unit.

For example, the timer can be a quartz or a RC oscillator. The emission angle sensor unit of the angle measurement device according to the present embodiment can be configured to determine, using the clocked time signal, the time points at which the receiver receives the reflected light beam, and by comparing the time points with a duration of rotation of the emitted light beam and the predefined reference direction, to detect the respective emission angles of the light beam emitted by the directional rotor at the respective time points.

The emission angle sensor unit can be configured to determine the predefined reference direction on the basis of a reference signal and to determine the duration of rotation as the time interval between the twice occurring of the reference signal.

For example, the reference signal can be generated by the receiver, when the rotating directional rotor directly emits the generated light beam, that means without said generated light beam is emitted to one of the workpiece surfaces in advance, anti-parallel to the propagation direction of the generated light beam to the receiver.

Advantageously, at the angle measurement device according to the present embodiment, it is thus possible to omit a separate angle sensor for the rotational position of the directional rotor. Thus, a more compact design and a reduction of the manufacturing costs of the angle measurement device are possible.

According to a further embodiment, the angle measurement device has a reference signal sensor configured to output a reference signal to the emission angle sensor unit, when the emitted light beam is emitted from the directional rotor in a reference direction.

The reference direction is the predefined reference direction. The emission angle can be defined as 0°, when the emission direction is the reference direction. For example, the reference signal sensor can be a photodiode which is arranged such that during one rotation of the directional rotor, the photodiode is exactly passaged over once from the light beam emitted from the directional rotor.

Thus, the emission angle sensor unit can determine the reference time point and the duration of rotation on the basis of the reference signal also then, when the reflection surface is arranged such that at no time point the light beam is directly emitted to the receiver, and advantageously at such arrangement, an angle sensor for the rotational position of the directional rotor can be omitted.

According to a further embodiment, the angle measurement device has an emission angle correcting unit for determining corrected emission angles of the light beam emitted from the directional rotor by correcting the detected emission angles of the light beam emitted from the directional rotor using the error model and the calibration parameters. Thereby, the evaluating unit is configured to determine the angle between the two workpiece surfaces as a function of the corrected emission angles.

In particular, the emission angle correcting unit can be configured to correct a respective detected emission angle by applying the mathematical function of the error model which is stored in the memory unit with the calibration parameters which are stored in the memory unit to the detected emission angle and to add a function result to the detected emission angle or to subtract it from him, and to determine an addition result or a subtraction result as the corrected emission angle.

According to a further embodiment, the error model is a sinusoidal error model.

Advantageously, a sinusoidal error model allows an easy and efficient modelling of errors in the context with the rotational movement of the directional rotor at which the error of the detected emission angle oscillates during one rotation of the emitted light beam at a zero point. In particular, multiple of the most powerful influenced device-specific error causes lead to a sinusoidal error cause or an approximately sinusoidal error cause with the single or the double of the angle position of the directional rotor such that by a sinusoidal error model, a particularly good error description with a minimal required number of calibration parameters is created.

According to a further embodiment, the error model comprises a linear combination of orthogonal functions of an emission angle of the light beam emitted by the directional rotor and the calibration parameters comprise coefficients of the linear combination.

By selecting suitable coefficients of the linear combination of the orthogonal functions, such as a sine function or a cosine function, of the emission angle, the error model can be adjusted to the phase angle and the amplitude of the oscillation of the error.

According to a further embodiment, the orthogonal functions comprise a sine function and a cosine function of a respective integer multiple and/or a respective integer fraction of the emission angle of the light beam emitted by the directing rotor.

If sine and cosine functions of integer multiple and/or integer fractions of the emission angle are involved in the error model, higher and/or lower orders or harmonic oscillations and/or subharmonics of the oscillation of the error can be taken into account. Advantageously, errors due to cogging torques in a magnetic system of the motor which drives the directional rotor, can be particularly modelled and corrected. The error model is clarified and the measurement accuracy of the angle measurement device can be further improved.

According to a further embodiment, the calibrating unit is configured, at a calibrating operation at which the axis of rotation of the directional rotor is arranged axially parallel to a vertex axis of an angle between two planar surfaces of a calibrating angle member and at which at least an arrangement comprising the transmitter, the directional rotor and the receiver is pivoted around the axis of rotation of the directional rotor between multiple pivotal positions by an operator or an extern apparatus and at each of the pivotal positions the angle between the planar surfaces of the calibrating angle member is determined, to determine the calibration parameters such that a deviation of the determinations of the angle between the planar surfaces of the calibrating angle member at the respective pivotal positions is reduced from each other or is minimized from each other, and to store the determined calibration parameters in the memory unit.

The calibrating angle member can be an arbitrary object with two planar surfaces as long as the angle enclosed by the planar surfaces is fixed or is unchanged at least during the period of the calibrating operation. The angle between the planar surfaces of the calibrating angle member is hereinafter referred to as calibrating angle. Note that for a calibration of the proposed angle measurement device according to the proposed calibrating operation, it is not required to know the angle value of the calibrating angle. Therefore, any accessible rigid angle member can be advantageously used as a calibrating angle member.

For example, at the pivoting of the arrangement having transmitter, directional rotor and receiver of the calibrating operation, the entire angle measurement device can be manually operated by an operator.

The calibrating unit can be configured to initiate the evaluating unit to determine in each of the pivotal positions the calibrating angle as a function of the detected emission angle of the light beam emitted from the directional rotor without taking into account calibration parameters or an error model or to suppress the correction effect of the error model for the determination of the calibration angle. Furthermore, the calibrating unit can be configured to determine a deviation between the multiple determinations of the calibrating angle at the respective pivotal positions and to choose suitable calibration parameters at which at a repetition of the determination of the calibrating angle in each of the pivotal positions by the evaluating unit, the deviation is minimized now by taking into account the selected calibration parameters and the stored error model. The deviation can be one or multiple mathematical or statistic quantities such as: one or more differences between the multiple determinations, a mean value of the multiple determinations, a standard deviation and/or a variance of the multiple determinations.

By the pivoting, the calibration angle is respectively determined as a function of different detected emission angles and thus at different rotational positions of the rotating directional rotor. If the detected emission angles are tainted with an error dependent on the emission angle or the rotational position of directional rotor, so the determinations of the constant calibration angle deviate from each other. By choosing suitable calibration parameters, the error model can be adapted such that it approximately represents at least a model for the device-specific error causes, such that at subsequent measurements, a deviation is minimized. Advantageously, a spreading of the measurement values is thus reduced, and the measurement accuracy of the angle measurement device is improved. Advantageously, an operator can perform the adjustment operation easily and within a very short time.

According to a further embodiment, the multiple pivotal positions comprise a respective outermost position and a middle position of a pivotal range. The pivotal range comprises at least 30°, preferably 60° and more preferably 90°.

The larger the pivotal range at the calibrating operation is chosen, the more exact the error model can be adapted at the calibrating operation to the device-specific error causes.

According to a further embodiment, the calibrating unit is configured, at the calibrating operation, to further determine the error model such that the deviation of the determinations of the angle between the planar surfaces of the calibrating angle member at the respective pivotal positions is reduced or minimized from each another, and to store the determined error model in the memory unit.

For example, the calibrating unit can be configured to compare, at the calibrating operation, a smallest deviation, achievable by choosing suitable calibration parameters with the stored error model, between the determinations of the calibrating angle at the multiple pivotal positions, with a predefined threshold value, and if the smallest deviation is above the threshold value, to choose a more precise error model and to store it in the memory unit and to determine once more suitable calibration parameters with that in connection with the more precise error model the deviation between the determinations of the calibrating angle at the multiple pivotal positions is further reduced or minimized. For example, a more precise error model can be an error model with a higher number of coefficients or calibration parameters.

For example, if instead of an error model that comprises a sine function and a cosine function of the emission angle of the light beam emitted from the directional rotor, an error model is selected that further comprises sine functions and cosine functions of integer multiple of the emission angle, so harmonics of the oscillation of the error during the rotation of the rotational rotor can also be taken into account. The accuracy of the calibration and thus the measurement accuracy of the angle measurement device can be further improved.

According to a further embodiment, the calibrating unit is configured to determine the calibration parameters by an iterative numerical method. An example for an iterative numerical method is the method of the conjunct gradient.

Thus, calibration parameters can also be determined then, when the error model does not allow an exact analytic solution.

According to a further embodiment, the angle measurement device has an operating element configured to signal an executing of the calibrating operation to the calibrating unit when an operator operates the operating element.

For example, the operating element can be a pushbutton implemented as a physical button or implemented as a switching surface on a display.

According to a further embodiment, the angle measurement device has a user interface unit configured to enable an operator to manually select the error model and/or to manually set the calibration parameters.

The user interface unit can comprise an output means and an input means. For example, the output means can comprise an LCD display or a TFT display and the input means can comprise a keyboard or a keypad, or the user interface unit can be formed as a touchscreen.

Thus, a calibration of the angle measurement device can be manually performed, if an automatic determination of the calibration parameters and/or the error model by the calibrating unit does not provide optimal results.

According to a further embodiment, the angle measurement device is formed as a hand angle measurement device with a display unit for displaying the angle.

The respective unit, e.g. the emission angle sensor unit, the evaluating unit, the calibrating unit and/or the rotation angle correcting unit, may be implemented in hardware and/or in software. If said unit is implemented in hardware, it may be embodied as a device or as a part of a device, e.g. as a computer, as a microprocessor, as a programmable control unit or as a hardwired circuit. If said unit is implemented in software, it may be embodied as a computer program product, as a function, as a routine, as a part of a program code or as an executable object.

According to a second aspect, a method for determining an angle between two workpiece surfaces is proposed, comprising: generating a light beam by means of a transmitter; emitting the generated light beam by means of a continuously rotating directional rotor in a rotating emission direction perpendicular to an axis of rotation of the directional rotor as an emitted light beam; receiving a reflected light beam by means of a receiver when the axis of rotation of the directional rotor is arranged axially parallel to a vertex axis of the angle and the emitted light beam is reflected antiparallel to the emission direction by one of the two workpiece surfaces as the reflected light beam; detecting respective emission angles of the light beam emitted by the directional rotor, at which the receiver receives the reflected light beam; determining at least calibration parameters; storing the calibration parameters and an error model; and determining the angle as a function of the detected emission angles of the light beam emitted by the directional rotor, the stored calibration parameters and the stored error model.

According to an embodiment of the second aspect, the method further comprises: providing a calibrating angle member with two planar surfaces including an angle; arranging the axis of rotation of the directional rotor axially parallel to the vertex axis of the angle between the planar surfaces of the calibrating angle member; pivoting an arrangement comprising at least the transmitter, the directional rotor and the receiver around the axis of rotation of the directional rotor between multiple pivotal positions; determining the angle between the planar surfaces of the calibrating angle member at each of the pivotal positions; and determining the calibration parameters and/or the error model such that a deviation of the determinations of the angle between the planar surfaces of the calibrating angle member at the respective pivotal positions is reduced from each other or is minimized from each other.

The embodiments and features described with reference to the device apply mutatis mutandis to the method.

Further possible implementations of the present invention also comprise not explicitly mentioned combinations of features or embodiments described above or below with regard to the embodiments. Thereby, the skilled person may also add isolated aspects as improvements or additions to the respective basic form of the present invention.

Further advantageous embodiments and aspects of the present invention are subject-matter of the dependent claims as well as the below described embodiments of the present invention. Furthermore, with reference to the attached drawings, the present invention is discussed in more detail on the basis of preferred embodiments.

DETAILED DESCRIPTION

Figure 1:
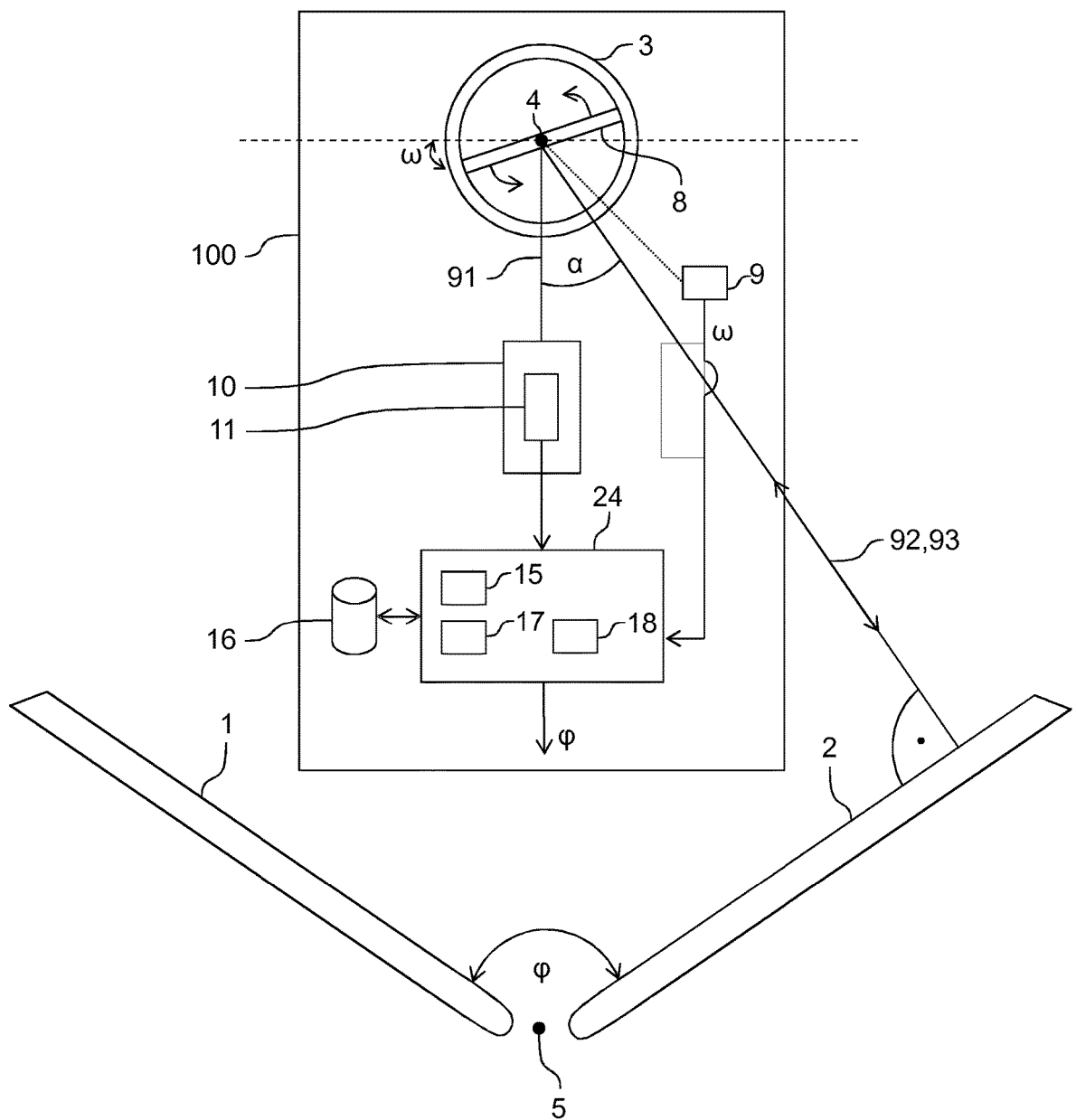
FIG. 1 shows a schematic end view of a proposed angle measurement device according to a first embodiment.

In the Figures, the same or functionally identical elements have been given the same reference numerals, unless otherwise indicated.

FIG. 1 shows a schematic representation of an angle measurement device 100 according to a first embodiment.

The angle measurement device 100 in FIG. 1 is arranged between two workpiece surfaces 1, 2 which enclose an angle φ to be determined with a vertex axis 5. The workpiece surfaces 1, 2 can be workpiece surfaces of the same workpiece or can be workpiece surfaces of different workpieces or objects, which are arranged, for example, in a fixed spatial arrangement to each other. The representation in FIG. 1 is not scaled.

The angle measurement device 100 of FIG. 1 has a transmitter 10 that generates a light beam 91; a directional rotor 3 with a reflection surface 8 which rotates with the directional rotor 3 around an axis of rotation 4 and extends towards the axis of rotation 4 and emits the generated light beam 91 as an emitted light beam 92 in a rotating emission angle α, and a receiver 11 which is substantially arranged at the transmitter 10. The receiver 11 outputs an electrical signal which indicates a light intensity received from the receiver 11 to the processing unit 24. In FIG. 1, a time point is illustrated at which the emitted light beam 92 is emitted under the instantaneous emission angle α towards a workpiece surface 2.

The processing unit 24 comprises an evaluating unit 17, a calibrating unit 15 and an emission angle sensor unit 18. The processing unit 24 is connected to a memory unit 16 and an angle sensor 9. In the memory unit 16, an error model (not shown) is stored that is suitable for modelling of device-specific error causes of the angle measurement device 100. In the memory unit 16, calibration parameters for the error model can be stored in order to calibrate the angle measurement device 100 by modelling of their device-specific error causes. This is described later in detail. The angle sensor 9 is coupled with a shaft (not shown) of a synchronous motor (not shown) driving the directional rotor 3 and outputs a rotational position ω of the shaft of the directional rotor 3. The processing unit 24 determines the angle φ as a function of input values and input signals which it receives from the receiver 11, the angle sensor 9 and the memory unit 16 and outputs a signal that indicates the specific angle φ as a measurement result.

Figure 2:
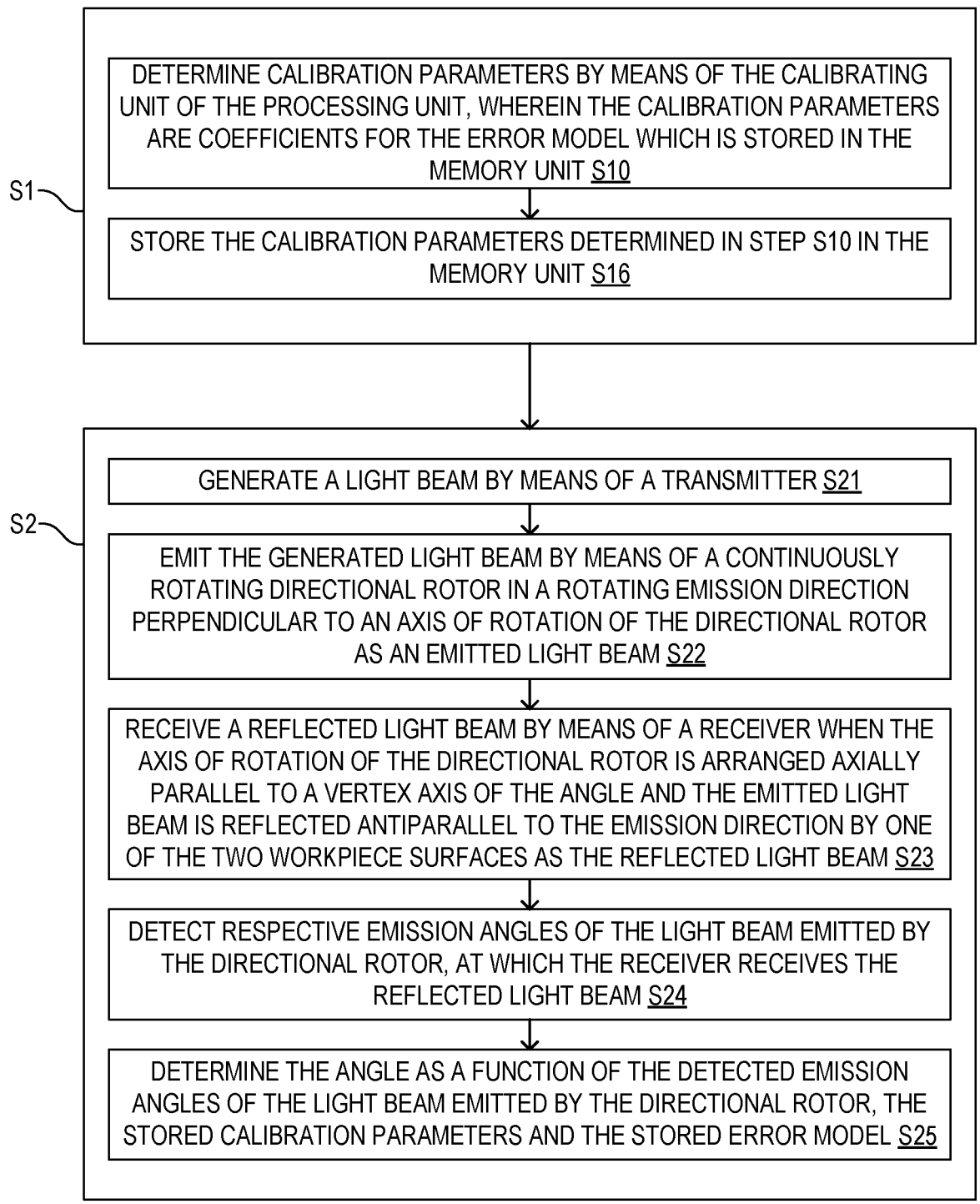
FIG. 2 illustrates a method for determining an angle by a proposed angle measurement device.

FIG. 2 illustrates a method for determining an angle φ with a proposed angle measurement device. The method is now explained based on FIG. 2 and based on the angle measurement device 100 shown in FIG. 1.

The method comprises a method stage S1 for calibrating the angle measurement device 100 and a method stage S2 for determining the angle φ to be determined.

In the method stage S1, in step S10, calibration parameters are determined by means of the calibrating unit 15 of the processing unit 24, wherein the calibration parameters are coefficients for the error model which is stored in the memory unit 16. The calibration parameters are determined such that the error model together with the calibration parameters at least approximately model the device-specific error causes of the angle measurement device 100. This will be described later in detail.

In step S16, the calibration parameters determined in step S10 are stored in the memory unit 16.

As shown in FIG. 1, for performing the method stage S2 for determining the angle φ, the angle measurement device 100 is arranged between the two workpiece surfaces 1, 2 such that the axis of rotation 4 of the directional rotor 3 is substantially axially parallel to the vertex axis 5 of the angle φ to be determined.

The transmitter 10 generates (step S21) a continuous light beam 91 which substantially propagates in a propagation direction from the transmitter 10 to the axis of rotation 4 of the directional rotor 3. The generated light beam 91 is emitted from the reflection surface 8 of the directional rotor 3, rotating counter-clockwise, as an emitted light beam 92 in a rotating emission direction (step S22). In other words, the rotating directional rotor 3 fans out the incoming light beam 91 in an emission plane (drawing plane in FIG. 1).

In FIG. 1, the angle α designates the emission angle α between the instantaneous emission direction of the emitted light beam 92 and the propagation direction of the generated light beam 91. The angle ω designates a rotational position ω of the directional rotor or the reflection surface 8 compared to a reference position at which the reflection surface 8 is oriented orthogonal to the propagation direction of the generated light beam 91 (broken line in FIG. 1). In the embodiment shown in FIG. 1, α=2ω holds true, that means during a half rotation (rotation about) 180° of the directional rotor 3, the emitted light beam 92 substantially passages over the entire emission plane (rotation about 360°, starting from the reference position at α=0° to approximately 180° and further from about −180° to 0°).

FIG. 1 shows a special emission direction α=α$_2$, at which the emitted light beam 92 hits substantially orthogonal onto the workpiece surface 2 and is reflected anti-parallel to its emission direction as a reflected light beam 93. By doing so, the reflected light beam 93 hits again onto the reflection surface 8 of the directional rotor 3 and from there further towards the transmitter 10 and is specifically reflected at the receiver 11 which is substantially arranged at the transmitter 10 such that the receiver 11 receives the reflected light beam 93 (step S23). The receiver 11 receives the reflected light beam 93 once more, when the emitted light beam 91 at an emission direction α=α$_1$, substantially hits orthogonal onto the workpiece surface 1.

Figure 3:
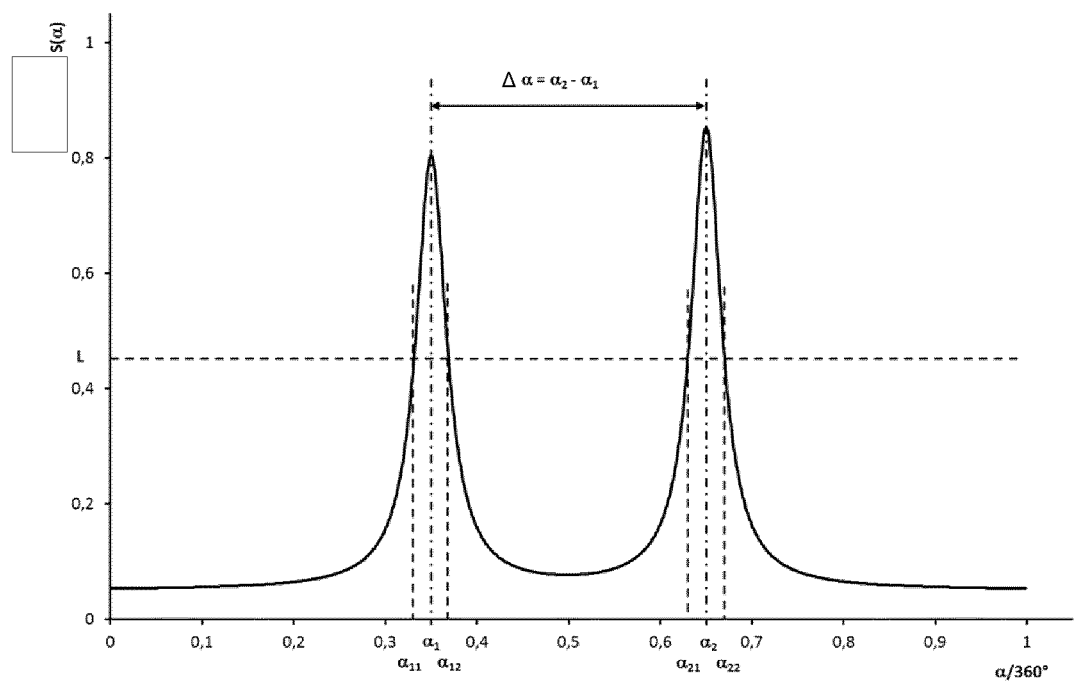
FIG. 3 shows an applying of a signal curve of the receiver in dependence on the emission angle of the emitted light beam at a proposed angle measurement device.

In step S24, the processing unit 24 detects, by means of the emission angle sensor unit 18, the emission angles α$_1$, α$_2$ of the light beam at which the receiver receives the reflected light beam 93. FIG. 3 shows a signal curve of the signal S output from the receiver 11 to the processing unit 24 in dependence on the emission angle α of the emitted light beam 92. The processing unit 24 monitors the signal S and initiates that the emission angle sensor unit 18 detects the angle α$_{11}$, when the signal S exceeds a predefined threshold value L, as well as detects the angle α$_{12}$, when the signal decreases under the predefined threshold value L. The emission angle sensor unit 18 gets a rotational position ω of the directional rotor 3 from the angle sensor 9 for detecting a respective emission angle α respectively and multiplies this with two in order to take into account the geometry of the arrangement shown in FIG. 1. Subsequently, the emission angle sensor unit 18 determines the emission angle α$_1$ as a mean value of the angles α$_{11}$ and α$_{12}$. The emission angle α$_2$ is determined in the same manner as the mean value of the angles α$_{21}$ and α$_{22}$.

In step S25, the processing unit 24 determines the angle φ by means of the evaluating unit 17 as a function of the detected emission angles α1 and α2, the error model stored in the memory unit 16 and the calibration parameters stored in the memory unit 16. According to FIG. 1 in connection with FIG. 3, the angle φ, at the theoretical absence of device-specific error causes, results by the term φ=180°−Δα, wherein, as later described in detail, the evaluating unit 17 corrects the angle φ and/or the emission angles α1 and α2 and/or their difference Δα using the error model and the calibration parameters.

According to the above-described method, the angle φ has therefore been determined contactlessly and with high accuracy.

In a variant of the first embodiment of the angle measurement device 100, the angle sensor 9 is not provided and the emission angle sensor unit 18 determines the emission angle by time measurement, as described later in detail.

In a further variant of the first embodiment, the reflection surface 8 is not provided and at least the receiver 11 and the transmitter 10 are fixed on the directional rotor 3 and rotate with this around the axis of rotation 4. In a further variant, the directional rotor 3 does not continuously rotate around, but makes a periodical pendulum movement such that the light beam is only fanned out over a set angle segment of, for example 180°, thus making the electrical connection of the transmitter 10 and the receiver 11 easier.

Figure 4:
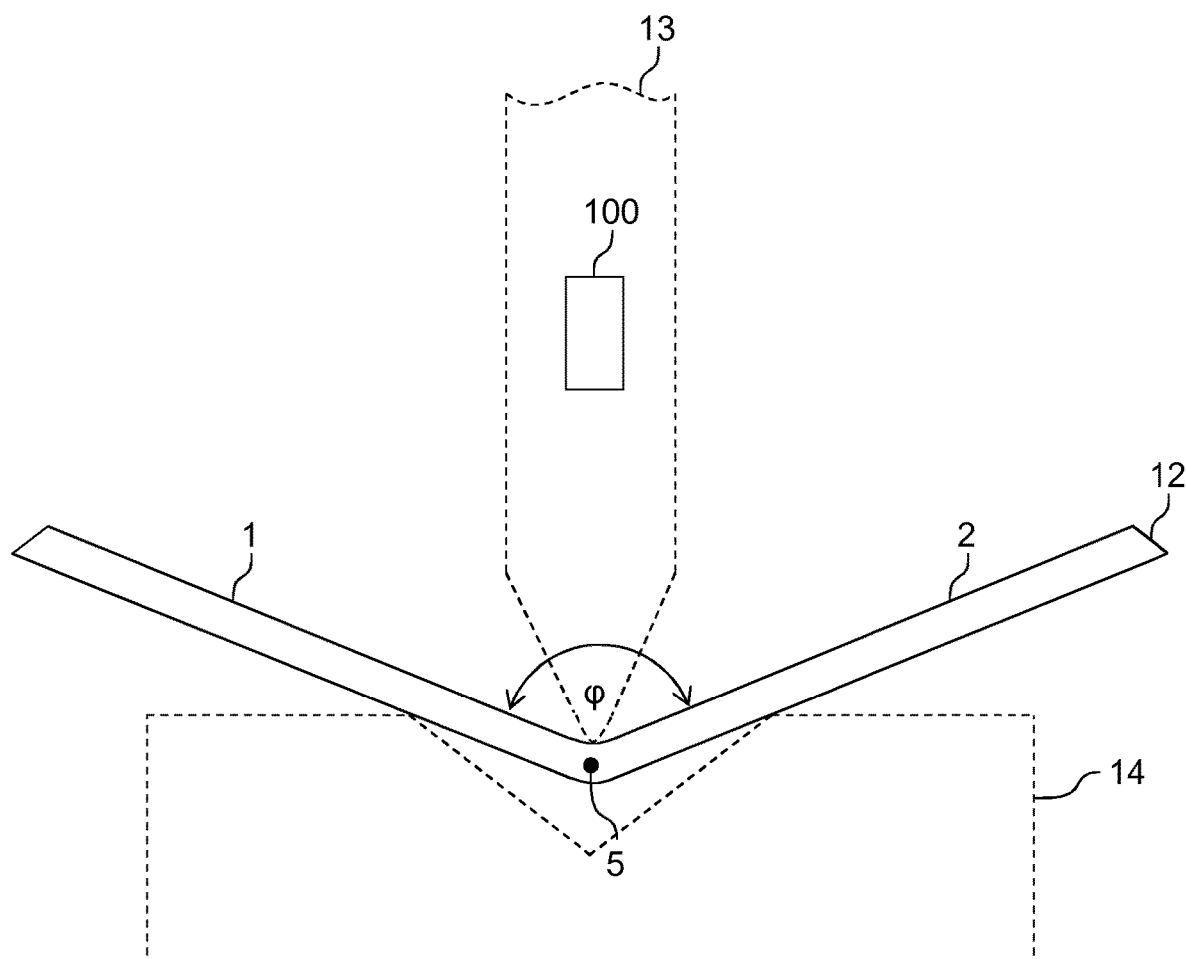
FIG. 4 shows an application example for a proposed angle measurement device and a proposed method for determining an angle.

FIG. 4 shows an application example for a proposed angle measurement device 100. Specifically, FIG. 4 shows a workpiece 12 to be bent with two workpiece surfaces 1, 2, that is pressed from a stamp 13 in a matrix 14. For example, the stamp is an upper tool of a sheet metal bent machine. The angle measurement device 100 is a device which is independent from the stamp 13, such as a hand angle measurement device that is held, for example, by an operator between the workpiece surfaces 1, 2. The angle measurement device 100 continuously determines the angle φ between the workpiece surfaces 1, 2, while the workpiece 12 is pressed into the matrix 14. When the desired angle φ$_{Soll}$, by taking into account a material-specific overbending, is achieved, the operator ends the pressing. Thus, a workpiece with the desired angle φ$_{Soll}$ can be precisely manufactured.

Figure 5:
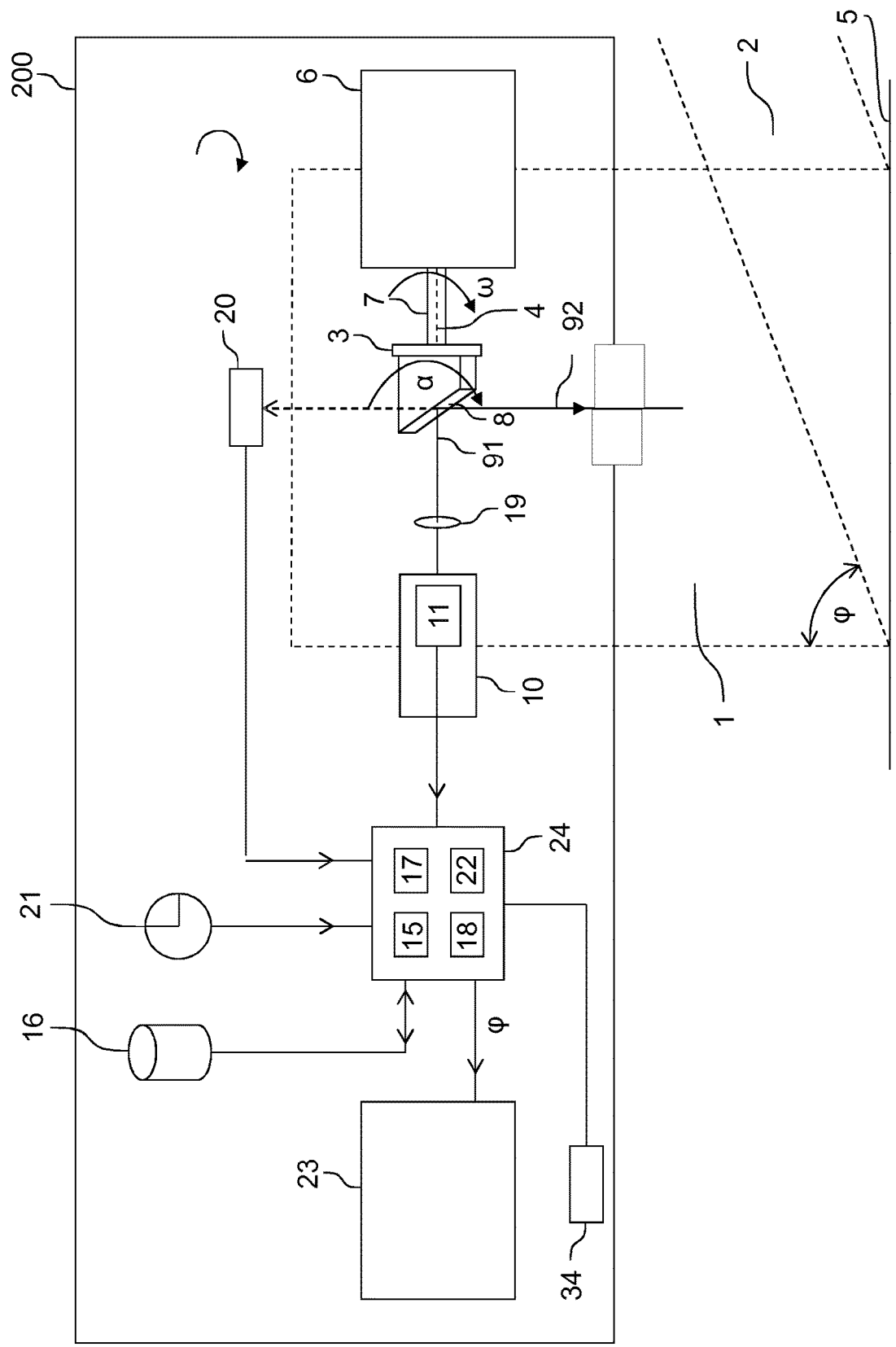
FIG. 5 shows a schematic lateral view of an angle measurement device according to a second embodiment.

FIG. 5 shows a second embodiment of a proposed angle measurement device 200 in a schematic lateral view. Hereinafter, the differences to the first embodiment are described.

The angle measurement device 200 is formed as a hand angle measurement device and has a display unit 23 for displaying the determined angle φ as well as a keypad 34. The keypad 34 is used as an operating element in order to signalize the calibrating unit 15 of the hand angle measurement device 200, as later described in detail, the beginning of a calibrating operation and/or is used as a part of a user interface unit comprising the keypad 34 and the display unit 23 with which an operator can manually set and/or correct the calibration parameters and/or the error model stored in the memory unit 16.

At the hand angle measurement device 200, different from the angle measurement device 100, the axis of rotation 4 of the directional rotor 3 driven from a miniature synchronous motor 6 via a shaft 7 extends coaxially with the propagation direction of the generated light beam 91. The reflection surface 8 of the directional rotor 3 extends in an angle of 45° obliquely to the axis of rotation 4 of the directional rotor 3. Thus, the generated light beam 91 is fanned out as an emitted light beam 92 in an emission plane which is orthogonal to both the axis of rotation 4 of the directional rotor 3 and to the propagation direction of the generated light beam 91. The rotational position ω of the directional rotor and the emission angle α of the light beam 92 emitted from the directional rotor 3 are identical in the second embodiment, except of possible deviations due to device-specific error causes.

Further, the hand angle measurement device 200 has a timer 21 which outputs a clocked time signal to the processing unit 24 as well as a reference signal sensor 20 arranged in the emission plane, such as a photodiode. The photodiode 20 outputs a reference signal to the processing unit 24 when the photodiode 20 is passaged over by the rotating emitted light beam 92 which is indicated in FIG. 5 by a broken arrow.

An angle sensor for the rotational position of the directional rotor 3 is not provided. In step S24, the emission angle sensor unit 18 of the hand angle measurement device 200 detects the emission angles α1 which the receiver 11 receives the reflected light beam 93 by means of time measurement, which is described hereinafter based on FIG. 6.

Figure 6:
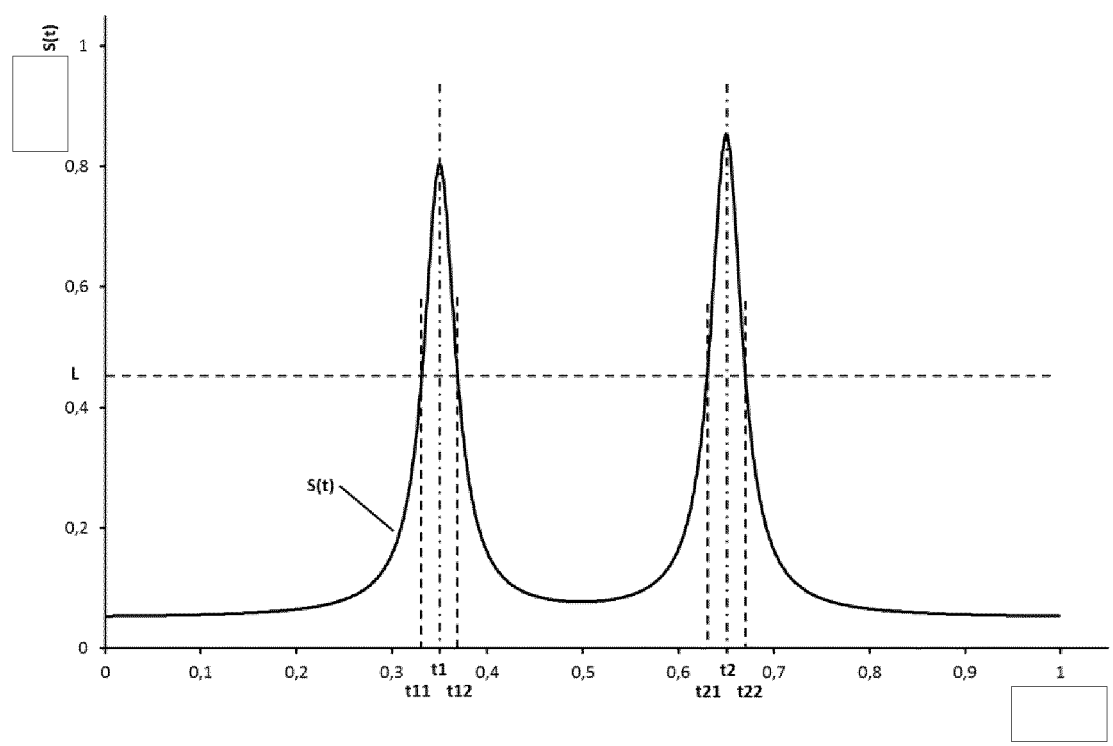
FIG. 6 shows an applying of a signal curve of the receiver in dependence on the time at an angle measurement device according to the second embodiment.

FIG. 6 shows an applying of a signal curve of the receiver 11 in dependence on the time at the hand angle measurement device 200. Since the directional rotor 3 rotates with a substantially constant rotation velocity, the time-dependent signal curve of FIG. 6 is qualitatively the same as the angle-dependent signal curve of FIG. 3.

Therefore, the emission angle sensor unit 18 of the hand angle measurement device 200 determines the time points t1 and t2 at which the receiver 11 receives the reflected light beam 93 on the basis of the clocked time signal of the timer 21, analogue to the first embodiment, by forming a mean value between the respective time points t11, t12 or t21, t22 at which the signal of the receiver 11 exceeds or does fall below a predetermined threshold value L. Afterwards, the emission angle sensor unit 18 detects the emission angles α1, α2 at which the receiver 11 receives the emitted light beam 93, by taking into relation the time points t1 and t2 with the duration of rotation T of the emitted light beam 92: $\alpha i=(ti-t0)/T$ with i=1,2. The time point t0 at which the emitted light beam 92 is emitted in the reference direction (α=0) is determined by the emission angle sensor unit 18 as the time point at which the reference signal sensor 20 outputs a reference signal, and the duration of rotation T is determined by the emission angle sensor unit 18 from the time difference between two reference signals.

In this way, the angle sensor 9 for the rotational position of the directional rotor 3 can be omitted and an especial compact design and low manufacturing costs of the hand angle measurement device 200 can be achieved.

Further, the processing device 24 of the hand angle measurement device 200 according to the second embodiment has an emission angle correcting unit 22. The emission angle correcting unit 22 determines the corrected emission angles $\alpha_{corr,1}$, $\alpha_{corr,2}$, by correcting the emission angles α1, α2 using the error model stored in the memory unit 16 and the calibration parameters stored in the memory unit 16 in step S25, as described later in detail. Afterwards, the evaluating unit 17 forms the angle difference $\Delta\alpha=\alpha_{corr,1}-\alpha_{corr,2}$ and determines the angle φ by φ=180°−Δα.

In particular, at the proposed embodiments of a proposed angle measurement device 100, 200, the following device-specific error causes can be present which affect the measurement accuracy of the angle determination:

In particular, when the angle measurement device 100, 200 is a hand device, there are ambitions to design the angle measurement device 100, 200 as compact as possible. The motor 6 can particularly only have a diameter of a few millimeters. Thereby, the moment of inertia of the motor 6 is very small and asymmetry and cogging torques in a magnetic system of the motor 6 can lead to fluctuations of the angle velocity within one rotation, even if a rotation mean velocity of the motor 6 is constantly hold over multiple rotations. If in the context of the miniaturization the angle sensor 9 is omitted, and as described above, if the emission angles α1, α2 are determined based on the time points t1, t2 at which the receiver 11 receives the reflected light beam 93 as well as the duration of rotation T of the light beam 92 emitted by the directional rotor 3, so an unevenly angle velocity of the motor 6 leads to an error of the detected emission angles α1, α2 which oscillates around a zero point. That means that depending on the rotational position ω of the directional rotor 3 or depending on the absolute value of the actual emission angle α, too small or too large emission angles α are alternately determined. Depending on a relative orientation of the angle measurement device 100, 200 to the workpiece surfaces 1, 2, the determination of the angle φ is carried out at different absolute emission angles α1, α2 such that depending on the orientation, determinations of the emission angles α1, α2 arise which deviate from each other and oscillate around a mean value and thus determinations of the angle φ arise.

Furthermore, at a miniaturized angle measurement device 100, 200, it is difficult to exactly orient the axis of rotation 4 of the directional rotor 3 and the propagation direction of the generated light beam 91, that means the axis of the transmitter 10, to each other. For example, if at the arrangement of the angle measurement device 200 according to the second embodiment the orientation of the transmitter 10 deviates about a specific angle error from the axis of rotation 4 of the directional rotor 3, so this affects, during one rotation of the reflection surface 8 of the directional rotor 3, a rotating-synchronous roaming around of the light beam 92 fanned out and emitted in the emission plane along a conical surface around an imaginary axis or an emission direction as it would be present at an error-free orientation. Thus, the emission angle of the emitted light beam 92 rushes forwards along a half of one rotation compared to the rotational position of the directional rotor 3 and falls back along the other half compared to the rotational position of the directional rotor 3. Also in this case, an error of the detected emission angles $\alpha_1$, $\alpha_2$ which oscillates around a zero point arises dependent on the orientation of the angle measurement device 200 error compared to the workpiece surfaces 2, 1.

A further device-specific error cause in the above-described arrangement of the receiver 11 substantially lies at the transmitter 10. If in the context of the miniaturization, a semi-permeable mirror in the beam path shall be omitted, so it would theoretically be necessary to arrange the receiver 11 exactly onto the axis of the light beam 93 reflected from the reflection surface 8 towards the transmitter 10, so that the receiver 11 receives the reflected light beam 93, when it is exactly anti-parallel reflected from one of the workpiece surfaces 1, 2.

Figure 7:
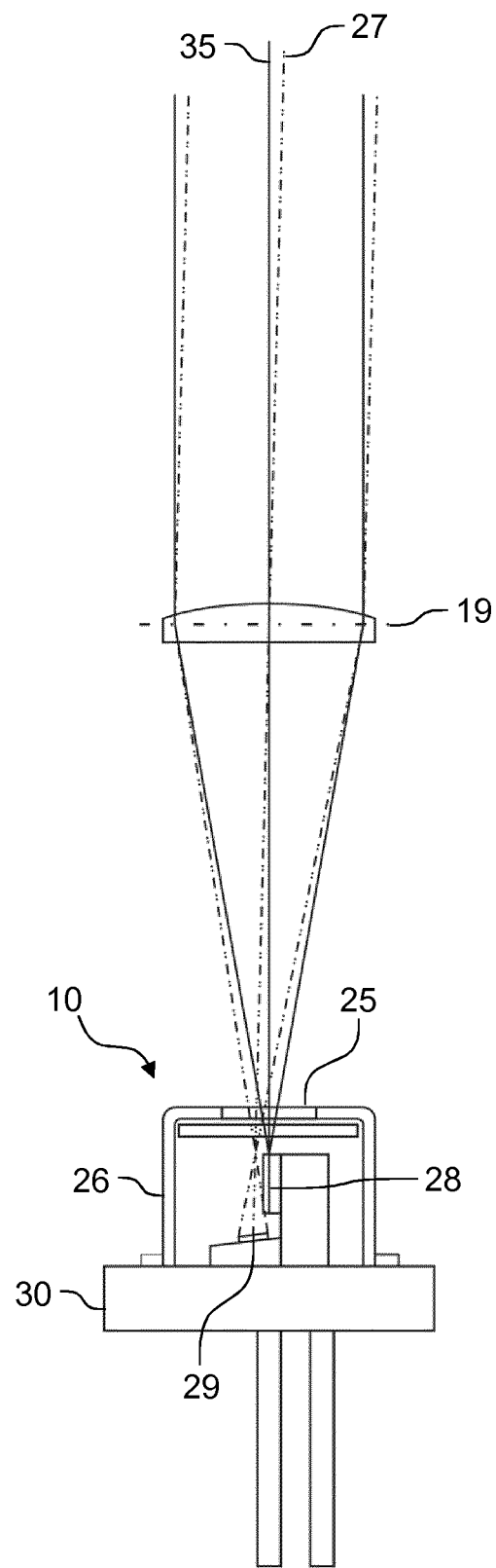
FIG. 7 shows a schematic representation of a laser diode in a proposed angle measurement device.

FIG. 7 shows a schematic representation of a laser diode 10, which is used, for example, in the hand angle measurement device 200 as a transmitter 10 with a receiver 11 integrated in the transmitter 10. The laser diode has a capsule 26 with a glass window 25, a laser chip 28, a monitor diode 29 and a basis 30. The monitor diode 29 detects a light part proportional to a laser power output from the laser chip 28 directly from a part-permeable mirrored backside of the laser chip 28 and detects at the same time the light beam 93 reflected back to the laser diode 10 from outside from one of the workpiece surfaces 1, 2 and supplies a current signal proportional to the entire detected amount of light. The monitor diode 29 thus serves as a receiver 11 in the hand angle measurement device 200.

The laser chip 28 generates a laser light with an opening angle of 8° to 22°, for example, from only a less micrometer small, also approximately ideal punctual emission surface. Because of this, at the hand angle measurement device 200, a collimation optic 19 is provided which bundles the generated laser light to a beam. Because of that, the laser diode 10 is positioned such that the laser chip 28 lies in the focus of the collimation optic 19. Compared to the emission surface of the laser chip, the monitor diode 29 has a comparable large-surface extension and is positioned in a defined distance to the laser chip 28 positioned in the focus, and is therefore positioned offside to the axis 35 of the generated light beam 91 and is therefore also positioned offside to the exact anti-parallelly reflected light beam 93. In particular, the center axis 27 of the field of vision of the monitor diode 29 is pivoted against the propagation direction of the light beam 91 bundled and generated from the collimation optic 19 due to the eccentrically positioning compared to the axis 35 of the generated light beam. Consequently, the monitor diode 29 (receiver 11) particularly does receive the reflected light beam 93 at short distances to the workpiece surfaces 1, 2 not exactly then, if the emitted light beam 92 perpendicular hits the workpiece surfaces 1,2 and is reflected exactly anti-parallel to its emission direction. Rather, the monitor diodes 29 receives the reflected light beam 93, when it is reflected from an angle which is slightly different from 180° from one of the workpiece surfaces 1, 2. This represents a further device-specific error cause for an orientation-depending error of the detected emission angles α1, α2.

As previously described, the proposed angle measurement device 200 has a calibrating unit 15 configured for determining calibration parameters, a memory unit 16 configured to store the calibration parameters and an error model, and an evaluating unit 17 and/or an emission angle correcting unit 22 which is configured to correct the detected emission angles α1, α2 based on the error model and the calibration parameters in order to determine corrected emission angles $\alpha_{1,corr}$, $\alpha_{2,corr}$ and to determine the angle φ as a function of the corrected emission angles $\alpha_{1,corr}$, $\alpha_{2,corr}$. Hereinafter, on the basis of FIGS. 8 to 11, an error model and method steps for calibrating the angle measurement device 200 are described in detail.

Figure 8:
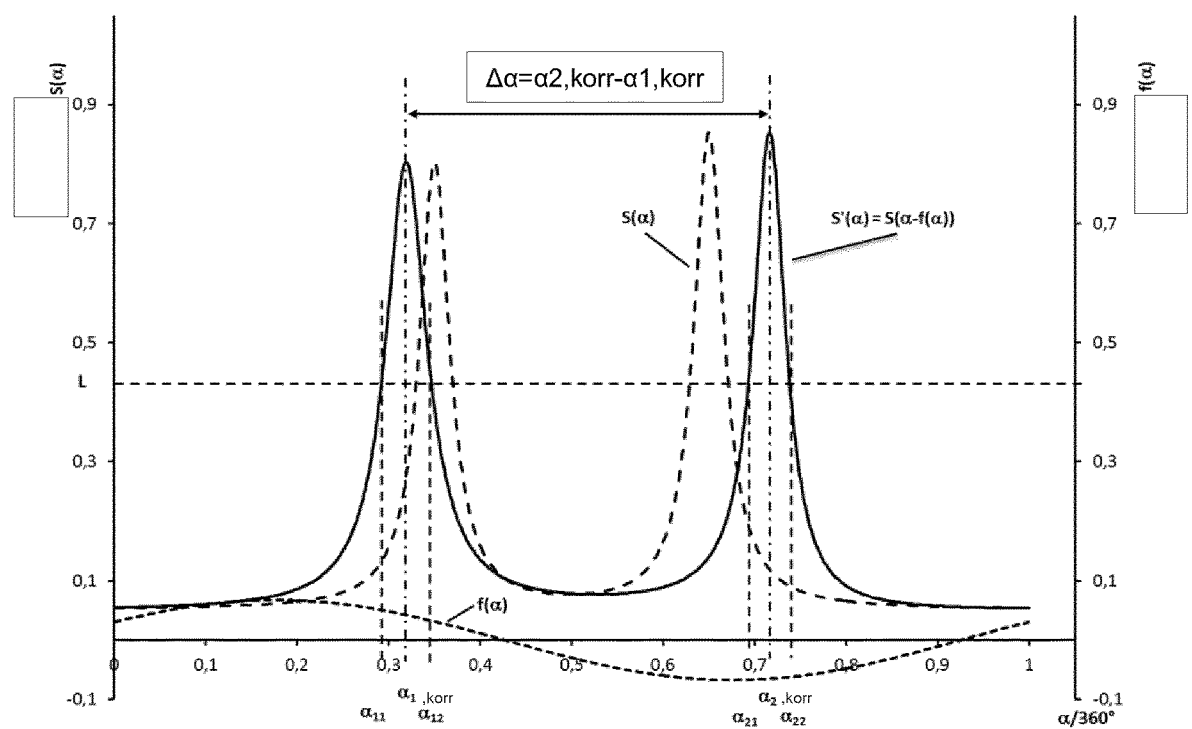
FIG. 8 shows an applying of a signal curve of the receiver, an error model and a corrected signal curve of the receiver in dependence on the emission angle emitted by the light beam.

FIG. 8 shows an applying of a signal curve S(α) of the receiver 11, an error model f(α) and a corrected signal curve S'(α) of the receiver 11 in dependence on the emission angle α of the emitted light beam 92.

The long-broken signal curve S(α) represents the actual signal curve of the receiver 11 in dependence on an erroneous emission angle α detected by the emission angle sensor unit 18. The short-broken line is an applying of a sinusoidal error model f(α) which is a mathematical function which assigns to a detected, erroneous emission angle α, a modelled magnitude of the error f(α).

For example, the error model can be stored in the memory unit 26 in the form of instructions wherein the instructions, if they are read out and executed by the processing unit 24, initiate the processing unit 24 to evaluate the mathematical function f(α). Alternatively, a section of the memory unit 26 in which the error model f(α) is stored, can be formed as a hardwired circuit. Alternatively and approximately, the function f(α) can be formed as a truth table in the memory.

The solid represented signal curve S'(α) indicates a corrected signal curve S'(α)=S(α−f(α)). That means that S'(α) is an applying of the signal of the receiver 11 in dependence on an emission angle $\alpha_{corr}=\alpha-f(\alpha)$ corrected by the error which is modelled with the error model f(α). Accordingly, both maxima of the corrected signal curve S'(α) are slid in the horizontal about the magnitude of the error f(α) applied in the vertical.

Under the theoretical assumption that the error model f(α) does exactly model the angle error of the detected emission angles α a which is caused by the device-specific error causes, the emission angle difference $\Delta\alpha=\alpha_{2,corr}-\Delta\alpha_{1,corr}$ which is detected based on the maxima of the corrected signal curve S'(α) refers to that emission angle difference whose usage by the evaluating unit 17 leads to the determination of the actual correct angle φ. In practice, variances are possible in which the error model f(α) can approximately model the actual error and thus at least improves the accuracy of the determination of the angle φ.

In FIG. 8, the corrected distance angle difference Δα is greater than the uncorrected distance angle difference of the broken maxima because the first maximum of the corrected signal curve S'(α) is further left as the maxima of the detected signal curve S(α), while the second maximum is further right. However, it can be seen that at other absolute values of the emission angle α at other positions of the curve of f(α), a corrected distance angle difference Δα could be smaller than an uncorrected distance angle difference. With other words, the deviation of the detected distance angle difference from the corrected distance angle differences Δα as well as the deviation of the detected distance angles from the corrected distance angles α oscillate sinusoidally around a zero point. In other words, if the angle measurement device 200 would not take the error model f(α) into account, the angle measurement device 200 would determine different angles φ which oscillate sinusoidally around the actual angle φ depending on how the angle measurement device 200 is oriented compared to the workpiece surfaces 1, 2.

In order to achieve the desired effect of an improvement of the measurement accuracy of a particularly contactlessly angle measurement device 100, 200, according to the proposed method at a calibrating operation calibration parameters are determined (step S10) which are, for example, coefficients for the error model f(α) which is stored in the memory unit 16 of the angle measurement device 100, 200. Using the calibration parameters, the error model f(α) can be adapted to the actual device-specific error causes.

The calibrating operation at which the determination of the calibration parameters is carried out, is described in the following based on the FIGS. 9 to 11. The description is carried out for the hand angle measurement device 200, but in this case, there is no limitation to this.

Figure 9:
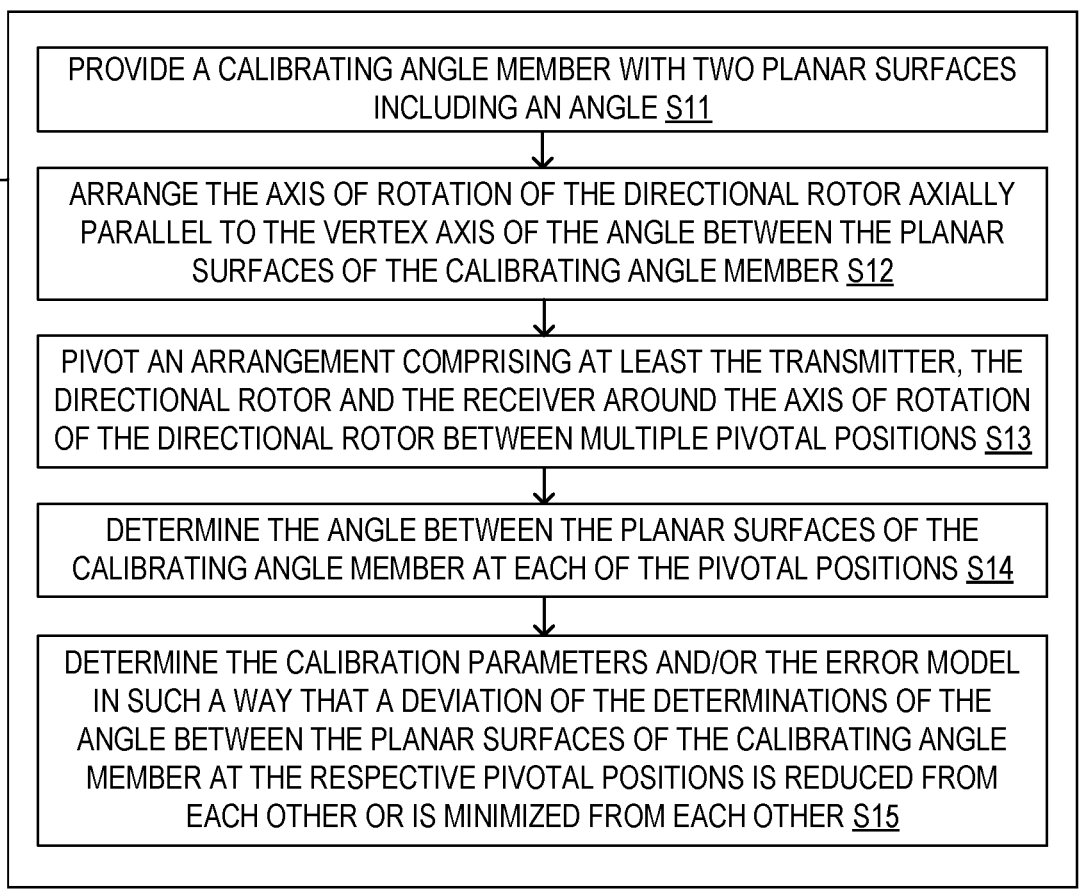
FIG. 9 illustrates steps for determining the calibration parameters according to a proposed method.

FIG. 9 illustrates the single steps S11 to S15 of step S10 for determining the calibration parameters according to a proposed method.

Figure 10:
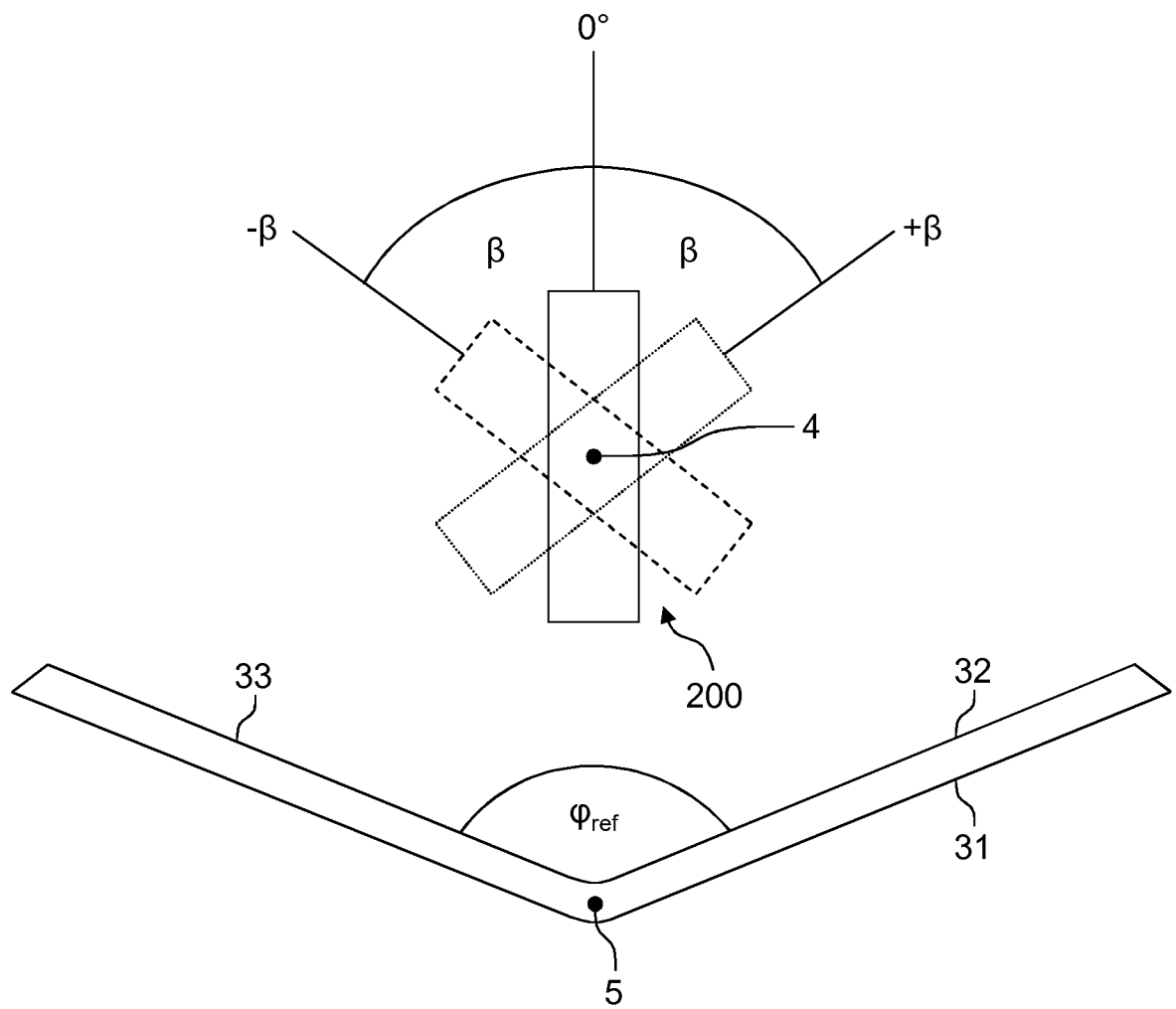
FIG. 10 shows a sketch for the illustration of a calibrating operation of a proposed angle measurement device.

FIG. 10 shows a sketch for illustrating a calibrating operation of an angle measurement device such as the hand angle measurement device 200.

The calibrating operation starts by providing a calibrating angle member 31 by an operator (S11) that has two planar surfaces 32, 33 which enclose an unchangeable calibration angle $\varphi_{ref}$, and the hand angle measurement device 200 is arranged such that the axis or rotation 4 of the directional rotor 3 is substantially arranged axially parallel to the vertex axis 5 of the calibrating angle $\varphi_{ref}$ (step S12).

The operator can signalize the start of the calibrating operation to the calibrating unit 15 of the processing unit 24 by pressing a button of the keypad 34 of the hand angle measurement device 200, for example.

Afterwards, the operator substantially pivots (step S13) the hand angle measurement device 200 around the axis of rotation 4 of the directional rotor 3 between the three pivotal positions $-\beta$, $0°$, $+\beta$.

Figure 11A:
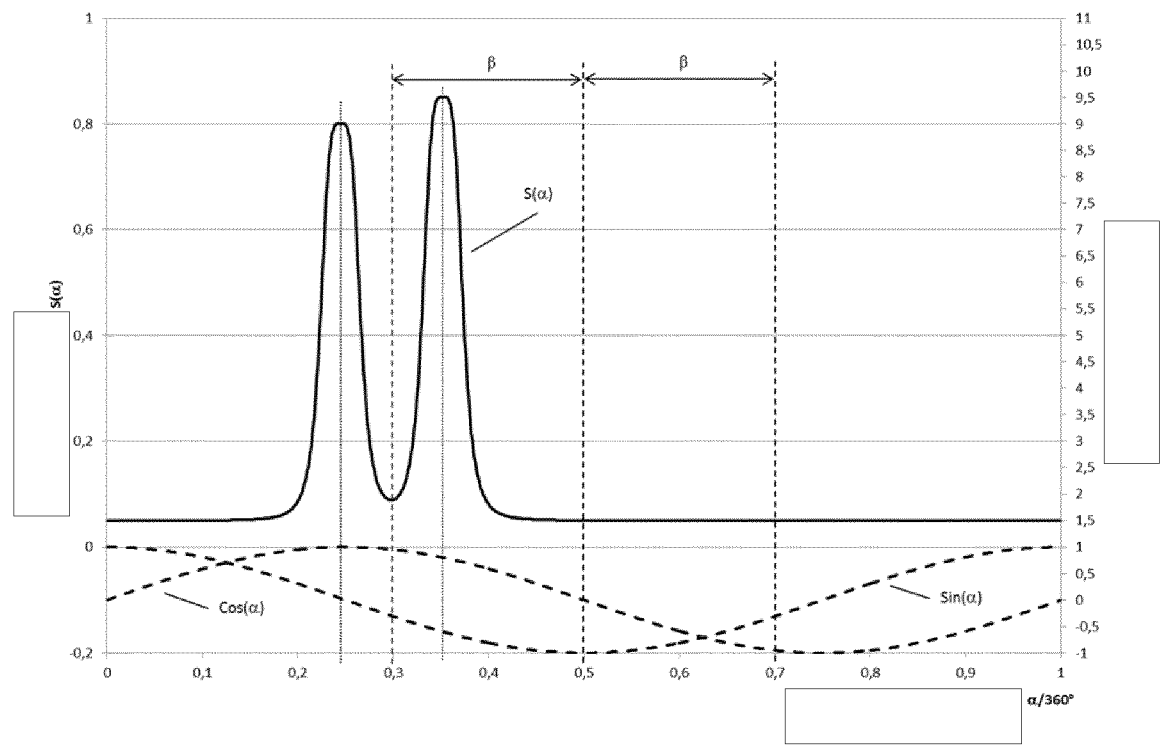
FIGS. 11a to 11c show applications of a signal curve of the receiver in dependence on the emission angle of the emitted light beam in different pivotal positions during the calibrating operation.
Figure 11B:
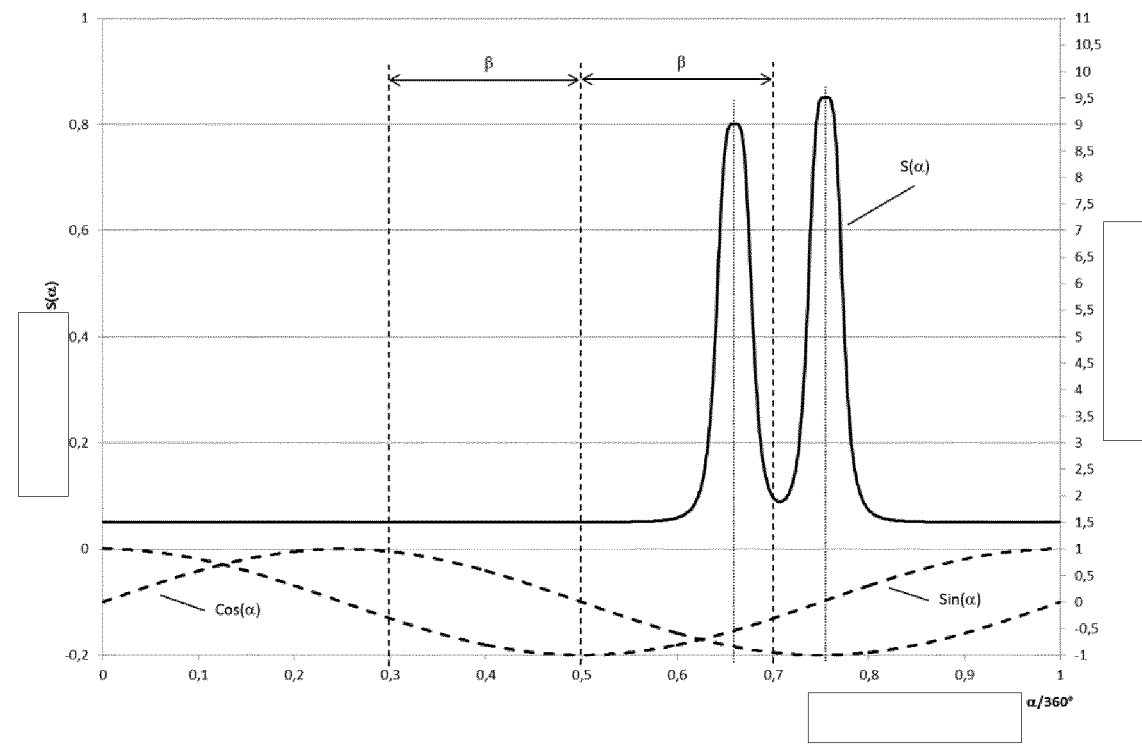
Figure 11C:
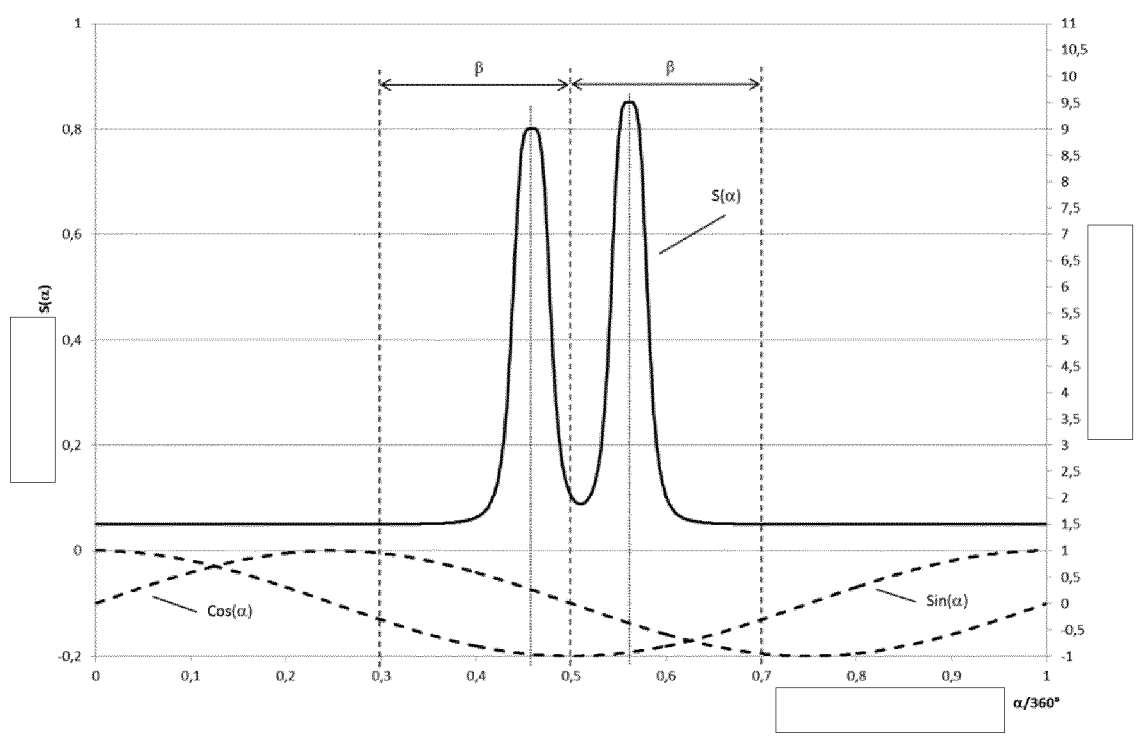

FIG. 11a shows the signal curve $S(\alpha)$ of the receiver 11 during the pivoting at a pivotal position $-\beta$ (broken represented hand angle measurement device 200 in FIG. 10), FIG. 11b shows the signal curve $S(\alpha)$ of the receiver 11 during the pivoting at a pivotal position $+\beta$ (dotted represented hand angle measurement device 200 in FIG. 10) and FIG. 11c shows the signal curve $S(\alpha)$ of the receiver 11 at a pivotal position $0°$ (solid represented hand angle measurement device 200 in FIG. 10).

As can be seen from FIGS. 11a to 11c, the pivotal position $\beta$ is an offset for the absolute values of the respective detected emission angles $\alpha_{1,2}$, at which the receiver 11 receives the reflected light beam 93 and at which maxima of the signal curve $S(\alpha)$ occur, while the distances between the emission angles $\alpha_{1,2}$ in the FIGS. 11a to 11c are respectively substantially equal, that means equal except by the deviations due to the device-specific error causes.

During the pivoting, the calibrating unit 15 initiates the processing unit 24 by using the evaluating unit 17 to determine the calibration angle $\varphi_{ref}$ repeatedly and particularly at each of the three pivotal positions $-\beta$, $0°$, $+\beta$ (S14), for which the steps S20 to S25 of the method illustrated in FIG. 2 are repeatedly performed. The calibration parameters can be initialized to zero or it can be initiated by a flag or the like in another manner that the error model remains firstly without taken into account.

As described above, due to the device-specific error causes, the detected emission angles $\alpha_1$, $\alpha_2$ at which the receiver 11 receives the reflected light beam 93 can deviate from the emission angles $\alpha_1$, $\alpha_2$ theoretically detected in an error-free case, so that, at each of the three pivotal positions $-\beta$, $0°$, $+\beta$, different determination results for the calibration angle $\varphi_{ref}$ arise.

In step S15, the calibrating unit 15 determines the calibration parameters such that a deviation of the determinations for the calibrating angle $\varphi_{ref}$ at the pivotal positions $-\beta$, $0°$, $+\beta$ is minimized when the determinations are performed by taking into account the error model $f(\alpha)$ and the calibration parameters.

In an embodiment, the error model $f(\alpha)$ is a linear combination of the sine function and the cosine function of the emission angle $\alpha$: $f(\alpha)=k_s \sin(\alpha)+k_c \cos(\alpha)$. The sine function and the cosine function are schematically represented broken in the FIGS. 11a to 11c. As mentioned earlier on the basis of FIG. 8, by using a sinusoidal error model $f(\alpha)$, the maxima of the corrected signal curve $S'(\alpha)$ can be slided compared to the maxima of the original signal curve $S(\alpha)$, that means the distance between the maxima can, depending on the absolute value of the respective emission angle $\alpha$, be made more narrow or broader. Thus, the calibrating unit 15 determines the calibration parameters or the coefficients $k_s$ and $k_c$ such that the distance between the maxima respectively shown in FIGS. 11a to 11c is balanced in the signal curves for each of the pivotal positions as far as possible. It is clear that by varying the coefficients $k_s$ and $k_c$, any arbitrary amplitude or phase angle of the sinusoidal error model $f(\alpha)$ can be represented.

The calibrating unit 15 can determine the calibration parameters at which the deviation between the determinations of the calibration angle $\varphi_{ref}$ is minimized by calculation, or it can use a numerical method at which the calibrating unit 15 iterates through a coordinate space $k_s$, $k_c$ and initiates, for each point $k_s$, $k_c$ which is passed through at the iteration for each of the pivotal positions $-\beta$, $0°$, $+\beta$, a repetitive determination of the calibration angle $\varphi_{ref}$ taking into account the error model $f(\alpha)$ with the respective values for the calibration parameters $k_s$, $k_c$. Thereby, merely the calculated determination of the calibration angle $\varphi_{ref}$ with the respective values for the calibration parameters $k_s$, $k_c$ can be repeated as long as the determined emission angles $\alpha_1$, $\alpha_2$ for each of the pivotal positions $-\beta$, $0°$, $+\beta$, for example, have been temporarily stored in the memory unit 16, or a new measurement can respectively be carried out according to the steps S21 to S25 of the method from FIG. 2. At iterating through the coordinate space, the calibrating unit 15 can approach to those calibration parameters $k_s$, $k_c$, for example, by means of the conjugated gradient method, for which the deviation of the determinations for the calibration angle $\varphi_{ref}$ is minimized for each of the pivotal positions $-\beta$, $0°$, $+\beta$.

In one variant, the pivotal position $13=0°$ is selected such that the reference direction, at which an emission angle $\alpha$ of $0°$ is determined, substantially coincides with the angle bisector of the calibration angle $\varphi_{ref}$. In this variant, the parameter $k_s$ is set to zero, and the calibration parameter $k_c$ is determined by calculation or iteratively numerically such that a deviation between the determinations for the calibration angle $\varphi_{ref}$ is minimized at the pivotal positions $-\beta$ and $+13$. Subsequently, at the fixed calibration parameter $k_c$, the calibration parameter $k_s$ is determined by calculation or iteratively numerically such that a deviation between the determinations for the calibration angle $\varphi_{ref}$ is minimized at the pivotal positions $-\beta$, $0°$ and $+\beta$. In this way, in an advantageous manner, a one-dimensional coordinate space is passed through twice, thus saves computing time compared to the variant in which a two-dimensional coordinate space is passed through.

In a further embodiment, if at step S15 the minimum achieved deviation of the determinations for the calibration angle $\varphi_{ref}$ at the pivotal positions $-\beta$, $0°$ and $+\beta$ does not fall below a predefined maximum value, the calibrating unit 15 can determine a more precise error model and store it in the memory unit 16, wherein, for example, the more precise error model additionally comprises a linear combination of sine functions and cosine functions of integer multiple of the emission angle $\alpha$ with the corresponding coefficients as calibration parameters, and step S15 is performed again, wherein the original coefficients and the additional coefficients are determined such that the deviation of the determinations of the calibration angle $\varphi_{ref}$ is minimized. In a preferred embodiment, the more precise error model comprises linear combination of sine function and cosine function of three times the emission angle $\alpha$. Such an error model allows the correction of error causes, such as strong cogging torque of the motor 6, which occur at an angle distance corresponding to the executed magnetic phases.

After in step S15 a suitable error model $f(\alpha)$ and suitable calibration parameters $k_s$, $k_c$, . . . have been determined, these are stored in the memory unit 16 of the hand angle measurement device 200 in step S16.

The calibrating operation is now completed. Note that, a knowledge of the calibrating angle $\varphi_{ref}$ is not required for performing the described calibrating operation. The calibration is carried out by simply pivoting the hand angle measurement device 200 between three pivotal positions −β, 0°, +β within the calibrating angle member 31 without inputting any further parameters.

The calibrated hand angle measurement device 200 can be used to determine an angle φ between two planar surfaces 1, 2, wherein, since in step S25 of the angle determination method illustrated in FIG. 2, the error model f(α) and the calibration parameters $k_s$, $k_c$, . . . from the memory unit 16 are taking into account, the hand angle measurement device 200 can approximately determine an angle φ to be determined independent of the relative orientation of the hand angle measurement device 200 compared to the planar surfaces 1, 2. Thus, the measurement results do spread less, and the measurement accuracy of the hand angle measurement device 200 is improved compared to a non-calibrated hand angle measurement device without having the proposed calibrating unit 15, memory unit 16 and emission angle correcting unit 22. Because of the calibration, a good measurement accuracy can also be achieved if the hand angle measurement device 200 has no angle sensor, no diagonal mirror in the beam path and highly miniaturized components, whose exact adjustment is time-consuming and expensive or is impossible. So, a miniaturization of the hand angle measurement device 200 and a reduction in development costs and manufacturing costs can be achieved. The performing of the calibration can be manually carried out by a user by simply pivoting the hand angle measurement device 200.

Although the present invention has been described in accordance with preferred embodiments, it is obvious for the skilled person that modifications are possible in all embodiments.

For example, at the first embodiment the angle sensor 9 can be omitted, and the detection of the emission angle α can be carried out time-based as in the second embodiment. Due to the arrangement of the first embodiment shown in FIG. 1, at which the reflection surface 8 is orthogonally arranged to the propagation direction of the generated light beam 91, particularly advantageously the reference signal sensor 20 can also be omitted here and the reference signal can instead be detected on the basis of the signal of the receiver S11, which is outputted by the receiver, when the reflected light beam 93 passages over the receiver S11 at a horizontal rotational position of the directional rotor in FIG. 1, without having first run to one of the workpiece surfaces 1, 2.

Instead of a linear combination of sine functions and cosine functions with the coefficients as calibration parameters, the error model f(α) can also be used only as a sine function or as a cosine function with the calibration parameters amplitude and phase position. Depending on the error to be modelled, also other orthogonal trigonometric or other functions can be selected for the error model f(α).

The calibrating operation, which comprises the steps S11 to S15 of method stage S1 for determining and storing the calibration parameters of the proposed angle determination method, has been exemplarily described based on the hand angle measurement device 200, wherein the steps have been performed in interaction between an operator who pivots the hand angle measurement device 200 and an automated calibrating unit 15, which determines the calibration parameters $k_s$, $k_c$ based on the emission angles $α_1$, $α_2$ detected at the pivotal positions −β, 0°, +β. However, the calibrating operation can also be carried out completely automatically, wherein an external device pivots an angle measurement device 100, 200. The calibrating operation can also be carried out completely manually, wherein, for example, an operator pivots a hand measurement device 200, and determines, based on the respective displayed results of the determination of the calibrating angle $φ_{ref}$ suitable calibration parameters $k_s$, $k_c$, . . . and/or a suitable error model f(α) and inputs suitable calibration parameters and/or the suitable error model via a user interface unit, for example, formed from the display unit 23 shown in FIG. 5 and the keypad 34 shown in FIG. 5, into the hand angle measurement device 200, or selects among several options a desired error model f(α) and/or calibration parameters $k_s$, $k_c$.

The pivotal positions used for the calibrating operation are not limited to the pivotal positions −β, 0°, +β, and arbitrary pivotal positions and any arbitrary number of pivotal positions can be used.

LIST OF REFERENCE CHARACTERS 100, 200 device for determining an angle
1, 2 workpiece surface
3 directional rotor
4 axis of rotation
5 vertex axis
6 motor
7 shaft
8 reflection surface
9 angle sensor
10 transmitter
11 receiver
12 workpiece
13 stamp
14 matrix
15 calibrating unit
16 memory unit
17 evaluating unit
18 emission angle sensor unit
19 collimation optic
20 reference signal sensor
21 timer
22 emission angle correcting unit
23 display unit
24 processing unit
25 glass window
26 capsule
27 center axis of the field of vision of the monitor diode
28 laser chip
29 monitor diode
30 basis
31 calibrating angle member
32, 33 planar surfaces
34 operating element
35 axis of the generated light beam
91 generated light beam
92 emitted light beam
93 reflected light beam
φ angle to be determined
$φ_{kal}$ calibrating angle
ω rotational position of the directional rotor
α emission angle of the emitted light beam
f(α) error model
β, 0°, +β pivotal positions
S1, S2 method stages
S10 . . . S25 method steps

The invention claimed is:
1. Device for determining an angle between two workpiece surfaces, comprising:
a transmitter for generating a light beam,
a continuously rotating directional rotor for emitting the generated light beam in a rotating emission direction perpendicular to an axis of rotation of the directional rotor as an emitted light beam, a receiver for receiving a reflected light beam when the axis of rotation of the directional rotor is arranged axially parallel to a vertex axis of the angle and the emitted light beam is reflected antiparallel to the emission direction by one of the two workpiece surfaces, an emission angle sensor unit for detecting respective emission angles of the emitted light beam at which the receiver receives the reflected light beam, characterized by a calibrating unit for determining at least calibration parameters, a memory unit for storing the calibration parameters and an error model, wherein the calibration parameters are coefficients of a mathematical function of the error model, the error model describes an angle-dependent error of the emission angle detected by the emission angle sensor unit, and the angle-dependent error has a device-specific error cause, and an evaluating unit configured to determine the angle as a function of the detected emission angles of the light beam emitted by the directional rotor, the stored calibration parameters and the stored error model.

2. Device according to claim 1,
characterized in
that the directional rotor forms a planar reflection surface for the light beam generated by the transmitter.

3. Device according to claim 1,
characterized in
that the transmitter has a monitor diode and the monitor diode forms the receiver.

4. Device according to claim 1,
characterized by
a timer configured to output a clocked time signal to the emission angle sensor unit.

5. Device according to claim 1,
characterized by
a reference signal sensor configured to output a reference signal to the emission angle sensor unit, when the emitted light beam is emitted from the directional rotor in a reference direction.

6. Device according to claim 1,
characterized by
an emission angle correcting unit for determining corrected emission angles of the light beam emitted from the directional rotor by correcting the detected emission angles of the light beam emitted from the directional rotor using the error model and the calibration parameters,
wherein the evaluating unit is configured to determine the angle as a function of the corrected emission angles.

7. Device according to claim 1,
characterized in
that the error model is a sinusoidal error model.

8. Device according to claim 1,
characterized in
that the error model comprises a linear combination of orthogonal functions of an emission angle of the light beam emitted by the directional rotor and the calibration parameters comprise coefficients of the linear combination.

9. Device according to claim 8,
characterized in
that the orthogonal functions comprise a sine function and a cosine function of a respective integer multiple and/or a respective integer fraction of the emission angle of the light beam emitted by the directional rotor.

10. Device according to claim 1,
characterized in
that the calibrating unit is configured, at a calibration process at which the axis of rotation of the directional rotor is arranged axially parallel to a vertex axis of an angle between two planar surfaces of a calibrating angle member and at which at least an arrangement comprising the transmitter, the directional rotor and the receiver is pivoted around the axis of rotation of the directional rotor between multiple pivotal positions by an operator or an extern apparatus and at each of the pivotal positions the angle between the planar surfaces of the calibrating angle member is determined, to determine the calibration parameters in such a way that a deviation of the determinations of the angle between the planar surfaces of the calibrating angle member at the respective pivotal positions is reduced from each other or is minimized from each other, and to store the determined calibration parameters in the memory unit.

11. Device according to claim 10,
characterized in
that the multiple pivotal positions comprise a respective outermost position and a middle position of a pivotal range and the pivotal range comprises at least 30°.

12. Device according to claim 10,
characterized in
that the calibrating unit is configured, at the calibration process, to further determine the error model in such a way that the deviation of the determinations of the angle between the planar surfaces of the calibrating angle member at the respective pivotal positions is reduced from each other or is minimized from each other, and to store the determined error model in the memory unit.

13. Device according to claim 10,
characterized in
that the calibrating unit is configured to determine the calibration parameters by an iterative numerical method.

14. Device according to claim 1,
characterized by
an operating element configured to signal an executing of the calibrating operation to the calibrating unit when an operator operates the operating element.

15. Device according to claim 1,
characterized by
a user interface unit configured to enable an operator to manually select the error model and/or to manually set the calibration parameters.

16. Device according to claim 1,
characterized in
that the device is formed as a hand angle measurement device with a display unit for displaying the angle.

17. Method for determining an angle between two workpiece surfaces, comprising:
generating a light beam by means of a transmitter,
emitting the generated light beam by means of a continuously rotating directional rotor in a rotating emission direction perpendicular to an axis of rotation of the directional rotor as an emitted light beam,
receiving a reflected light beam by means of a receiver when the axis of rotation of the directional rotor is arranged axially parallel to a vertex axis of the angle and the emitted light beam is reflected antiparallel to the emission direction by one of the two workpiece surfaces as the reflected light beam,
detecting respective emission angles of the light beam emitted by the directional rotor, at which the receiver receives the reflected light beam, characterized by determining at least calibration parameters, storing the calibration parameters and an error model, wherein the calibration parameters are coefficients of a mathematical function of the error model, the error model describes an angle-dependent error of the emission angle detected by an emission angle sensor unit, and the angle-dependent error has a device-specific error cause, and determining the angle as a function of the detected emission angles of the light beam emitted by the directional rotor, the stored calibration parameters and the stored error model.

18. Method according to claim 17, characterized by providing a calibrating angle member with two planar surfaces including an angle, arranging the axis of rotation of the directional rotor axially parallel to the vertex axis of the angle between the planar surfaces of the calibrating angle member, pivoting an arrangement comprising at least the transmitter, the directional rotor and the receiver around the axis of rotation of the directional rotor between multiple pivotal positions, determining the angle between the planar surfaces of the calibrating angle member at each of the pivotal positions, and determining the calibration parameters and/or the error model in such a way that a deviation of the determinations of the angle between the planar surfaces of the calibrating angle member at the respective pivotal positions is reduced from each other or is minimized from each other.

* * * * *